(12) United States Patent
Rule et al.

(10) Patent No.: US 11,292,870 B2
(45) Date of Patent: Apr. 5, 2022

(54) POLYMERIC MATERIAL INCLUDING A URETDIONE-CONTAINING MATERIAL, TWO-PART COMPOSITIONS, AND METHODS

(71) Applicant: 3M INNOVATIVE PROPERTIES COMPANY, St. Paul, MN (US)

(72) Inventors: Joseph D. Rule, Woodbury, MN (US); Zachary J. Thompson, Woodbury, MN (US); Michael A. Kropp, Cottage Grove, MN (US); Kolby L. White, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 102 days.

(21) Appl. No.: 16/632,679

(22) PCT Filed: Aug. 20, 2018

(86) PCT No.: PCT/IB2018/056288
§ 371 (c)(1),
(2) Date: Jan. 21, 2020

(87) PCT Pub. No.: WO2019/048956
PCT Pub. Date: Mar. 14, 2019

(65) Prior Publication Data
US 2020/0207909 A1  Jul. 2, 2020

Related U.S. Application Data

(60) Provisional application No. 62/555,085, filed on Sep. 7, 2017.

(51) Int. Cl.
| | | |
|---|---|---|
| *C08G 18/79* | (2006.01) | |
| *C08G 18/12* | (2006.01) | |
| *C08G 18/22* | (2006.01) | |
| *C08G 18/28* | (2006.01) | |
| *C08G 18/32* | (2006.01) | |
| *C08G 18/50* | (2006.01) | |
| *C08G 18/73* | (2006.01) | |
| *C09J 5/00* | (2006.01) | |
| *C09J 175/08* | (2006.01) | |

(52) U.S. Cl.
CPC .......... *C08G 18/798* (2013.01); *C08G 18/12* (2013.01); *C08G 18/227* (2013.01); *C08G 18/282* (2013.01); *C08G 18/2825* (2013.01); *C08G 18/324* (2013.01); *C08G 18/3206* (2013.01); *C08G 18/3228* (2013.01); *C08G 18/3234* (2013.01); *C08G 18/5024* (2013.01); *C08G 18/73* (2013.01); *C09J 5/00* (2013.01); *C09J 175/08* (2013.01); *C09J 2475/00* (2013.01)

(58) Field of Classification Search
CPC .... C08G 18/798; C08G 18/12; C08G 18/282; C08G 18/2825; C08G 18/3206
See application file for complete search history.

(56) References Cited

U.S. PATENT DOCUMENTS

| | | | |
|---|---|---|---|
| 3,793,238 A | | 2/1974 | Winkelmann |
| 4,044,171 A | * | 8/1977 | Muller ............... C08G 18/2805 427/485 |
| 4,289,813 A | | 9/1981 | Blomeyer |
| 4,483,798 A | * | 11/1984 | Disteldorf ............ C07D 229/00 528/59 |
| 5,410,011 A | * | 4/1995 | Konishi ............... C08G 18/798 528/45 |

(Continued)

FOREIGN PATENT DOCUMENTS

WO  WO 1997-18257  5/1997

OTHER PUBLICATIONS

Scintek. Sales ad Information page for Brookfield LVDVII+ Pro Digital Viscometer. (Year: 2021).*
V&P Scientific. Viscosity Tables. www.vp-sci.com. (Year: 2010).*
Bakhshi, "Dendrons as active clicking tool for generating non-leaching antibacterial materials", Polymer Chemistry, 2016, vol. 7, pp. 5322-5330.

(Continued)

*Primary Examiner* — Michael M Dollinger
(74) *Attorney, Agent, or Firm* — Adrian L. Pishko

(57) ABSTRACT

The present disclosure provides a polymeric material including a reaction product of a polymerizable composition and having a solids content of 90% or greater. The polymerizable composition includes a uretdione-containing material including a reaction product of a diisocyanate reacted with itself, a first hydroxyl-containing compound having a single OH group, and a second hydroxyl-containing compound having more than one OH group. The first hydroxyl-containing compound is a primary alcohol or a secondary alcohol, plus the second hydroxyl-containing compound is a diol and the reaction product contains 0.2 to 0.5, inclusive, of diol equivalents relative to isocyanate equivalents. The present disclosure also provides a two-part composition, in which the polymeric material is included in the first part and the second part includes at least one amine. Further, a method of adhering two substrates is provided, including obtaining a two-part composition; combining at least a portion of the first part with at least a portion of the second part to form a mixture; disposing at least a portion of the mixture on a first substrate; and contacting a second substrate with the mixture disposed on the first substrate. The disclosure also provides a polymeric material and a method of making a two-part composition. Advantageously, two-part compositions according to the present disclosure can be used as coatings and adhesive systems with handling and performance similar to existing two-part urethane systems, but with less sensitivity to water.

20 Claims, 2 Drawing Sheets

(56) References Cited

U.S. PATENT DOCUMENTS

| | | | | |
|---|---|---|---|---|
| 5,596,066 | A | * | 1/1997 | Laas ................ C08G 18/798 252/182.2 |
| 5,631,341 | A | | 5/1997 | Morishima |
| 5,814,689 | A | | 9/1998 | Goldstein |
| 5,861,193 | A | | 1/1999 | Goldstein |
| 5,912,314 | A | * | 6/1999 | Wolf ................ C08G 18/8038 528/45 |
| 7,019,088 | B1 | | 3/2006 | Lehmann |
| 7,652,166 | B2 | | 1/2010 | Haubennestel |
| 8,569,440 | B2 | * | 10/2013 | Spyrou ............... C08G 18/166 528/52 |
| 8,841,369 | B2 | * | 9/2014 | Meyer ................ C08G 18/798 524/190 |
| 9,080,074 | B2 | * | 7/2015 | Shaffer ............. C08G 18/1883 |
| 2005/0250927 | A1 | * | 11/2005 | Pritschins ............ C08G 18/798 528/44 |
| 2007/0259120 | A1 | | 11/2007 | Haubennestel |
| 2009/0156738 | A1 | * | 6/2009 | Laas ................ C08G 18/3206 524/589 |
| 2015/0175859 | A1 | | 6/2015 | Greszta-Franz |

OTHER PUBLICATIONS

Carothers, "Polymers and Polyfunctionality", Transactions of the Faraday Society, 1936, vol. 32, pp. 39-49.

Chandalia, "New Non-Isocyanate Curatives for 2k Solvent-Borne Urethane Coatings", Proceedings of the Twenty-Eighth International Waterborne, High-Solids, and Powder Coatings Symposium, The University of Southern Mississippi, Feb. 2001, pp. 77-89.

Chen, "Novel Water-Borne Polyurethane Coatings", The Water-Borne, Higher Solids and Powder Coatings Symposium, The University of Polymer Science and Southern Society for Coatings Technology, Feb. 1996, pp. 103-114.

Gedan-Smolka, "New Catalysts for The Low Temperature Curing of Uretdione Powder Coatings", Proceedings of the Twenty-Eighth International Waterborne, High-Solids, and Powder Coatings Symposium, The University of Southern Mississippi, Feb. 2001, pp. 405-419.

Raw Materials for Automotive Refinish Systems, Bayer Material Science, 24 pages.

International Search Report for PCT International Application No. PCT/IB2018/056288, dated Dec. 10, 2018, 4 pages.

* cited by examiner

POLYMERIC MATERIAL INCLUDING A URETDIONE-CONTAINING MATERIAL, TWO-PART COMPOSITIONS, AND METHODS

CROSS REFERENCE TO RELATED APPLICATIONS

This application is a national stage filing under 35 U.S.C. 371 of PCT/IB2018/056288, filed Aug. 20, 2018, which claims the benefit of U.S. Application No. 62/555,085, filed Sep. 7, 2017, the disclosure of which is incorporated by reference in its/their entirety herein.

TECHNICAL FIELD

The present disclosure relates to polymeric materials that include uretdione-containing materials, such as two-part compositions.

BACKGROUND

Two-part urethane adhesives and sealants are commercially available from a variety of companies. These systems typically involve one component that is an oligomer/polymer terminated with isocyanate groups and a second component that is a polyol. When mixed, the isocyanate reacts with polyol to form carbamate groups. While this is established and effective chemistry, it suffers from a sensitivity to moisture due to ability of the isocyanate to be deactivated when reacted with water. Hence, there remains a need for adhesives and sealants that advantageously have less sensitivity to water.

SUMMARY

In a first aspect, a polymeric material is provided. The polymeric material includes a reaction product of a polymerizable composition and has a solids content of 90% or greater. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. Typically, the second hydroxyl-containing compound is a diol and the reaction product comprises 0.2 to 0.5, inclusive, of diol equivalents relative to isocyanate equivalents.

In a second aspect, a two-part composition is provided. The two-part composition includes a first part including a polymeric material including a reaction product of a polymerizable composition; and a second part including at least one amine. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The at least one amine has an average amine functionality of 2.0 or greater and each amine is a primary amine or a secondary amine. The polymeric material has a solids content of 90% or greater, plus often comprises an average of 1.3 to 2.5, inclusive, of a uretdione functional group in a backbone of the polymeric material.

In a third aspect, a polymerized product is provided. The polymerized product is the polymerized product of the two-part composition according to the second aspect.

In a fourth aspect, a method of adhering two substrates is provided. The method includes obtaining a two-part composition; combining at least a portion of the first part with at least a portion of the second part to form a mixture; disposing at least a portion of the mixture on a first major surface of a first substrate; and contacting a first major surface of a second substrate with the mixture disposed on the first substrate. The two-part composition includes a first part including a polymeric material including a reaction product of a polymerizable composition; and a second part including at least one amine. The at least one amine has an average amine functionality of 2.0 or greater, and each amine is a primary amine or a secondary amine. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The polymeric material has a solids content of 90% or greater, plus often comprises an average of 1.3 to 2.5, inclusive, of a uretdione functional group in a backbone of the polymeric material.

In a fifth aspect, a method of making a two-part composition is provided. The method includes providing a first part by forming a polymeric material including a reaction product of a polymerizable composition; and providing a second part including at least one amine. The at least one amine has an average amine functionality of 2.0 or greater and each amine is a primary amine or a secondary amine. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The polymeric material has a solids content of 90% or greater, plus often comprises an average of 1.3 to 2.5, inclusive, of a uretdione functional group in a backbone of the polymeric material.

The above summary is not intended to describe each embodiment or every implementation of aspects of the invention. The details of various embodiments are set forth in the description below. Other features, objects, and advantages will be apparent from the description and from the claims.

Figure 1:
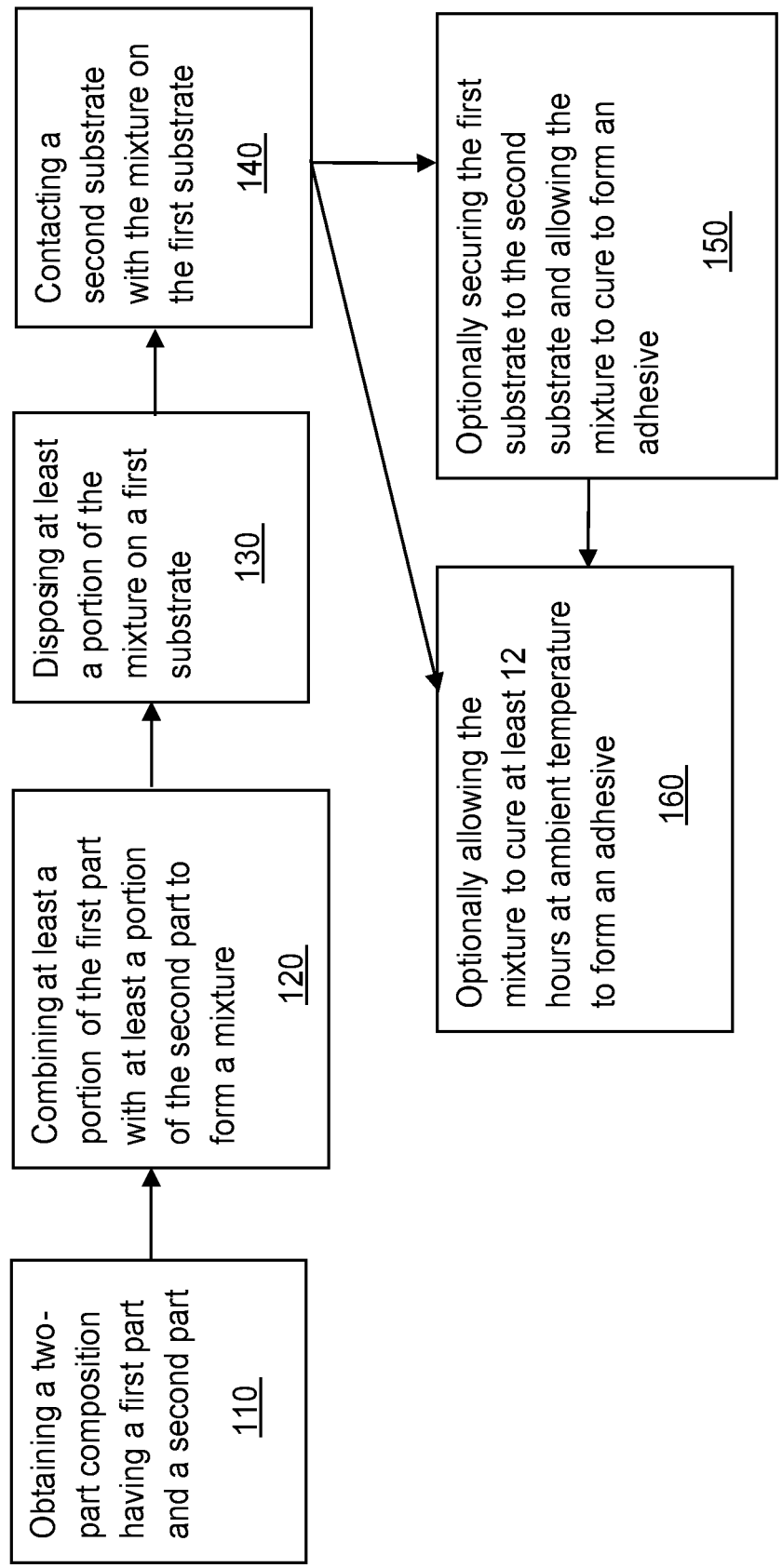
FIG. 1 is a flow chart of an exemplary method of adhering two substrates together, according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The present disclosure provides polymeric materials, polymerizable compositions, and two-part compositions useful for instance in coatings and/or adhesives that have good flowability and reactivity (e.g., without added solvent), acceptable cure and/or adhesion in a short amount of time, as compared to similar compositions instead containing isocyanates. Further, coatings and adhesives according to at least certain embodiments of the present disclosure are essentially free of isocyanates. This is advantageous because isocyanates tend to be sensitizers upon first contact (e.g., to skin) such that subsequent contact causes inflammation. Coatings/adhesives containing isocyanates exhibit more sensitivity to water than other compounds, as noted above, so minimizing an isocyanate content in a coating or adhesive may improve reliability during curing as well as simplify storage and handling of the polymeric materials, polymerizable compositions, and two-part compositions.

The terms "a", "an", "the", "at least one", and "one or more" are used interchangeably.

The term "and/or" means one or both such as in the expression A and/or B refers to A alone, B alone, or to both A and B.

The term "essentially" means 95% or more.

The term "equivalents" refers to the number of moles of a functional group (e.g., OH groups, isocyanate groups, uretdione groups, etc.) per molecule of a polymer chain or per mole of a different functional group.

The term "alkyl" refers to a monovalent radical of an alkane. Suitable alkyl groups can have up to 50 carbon atoms, up to 40 carbon atoms, up to 30 carbon atoms, up to 20 carbon atoms, up to 16 carbon atoms, up to 12 carbon atoms, up to carbon atoms, up to 8 carbon atoms, up to 6 carbon atoms, up to 4 carbon atoms, or up to 3 carbon atoms. The alkyl groups can be linear, branched, cyclic, or a combination thereof. Linear alkyl groups often have 1 to 30 carbon atoms, 1 to 20 carbon atoms, 1 to 10 carbon atoms, 1 to 6 carbon atoms, or 1 to 4 carbon atoms. Branched alkyl groups often have 3 to 50 carbon atoms, 3 to 40 carbon atoms, 4 to 20 carbon atoms, 3 to 10 carbon atoms, or 3 to 6 carbon atoms. Cyclic alkyl groups often have 3 to 50 carbon atoms, 5 to 40 carbon atoms, 6 to 20 carbon atoms, 5 to 10 carbon atoms, or 6 to 10 carbon atoms.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 4 to 14 carbon atoms, 1 to 10 carbon atoms, 1 to 8 carbon atoms, 1 to 6 carbon atoms, or 1 to 4 carbon atoms. The radical centers of the alkylene can be on the same carbon atom (i.e., an alkylidene) or on different carbon atoms. In certain embodiments, the alkylene can be substituted with an OH group.

The term "alkane-triyl" refers to a trivalent radical of an alkane.

The term "aryl" refers to a monovalent group that is radical of an arene, which is a carbocyclic, aromatic compound. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl.

The term "aralkyl" refers to a monovalent group of formula —R—Ar where R is an alkylene and Ar is an aryl group. That is, the aralkyl is an alkyl substituted with an aryl.

The term "aralkylene" refers to a divalent group of formula —R—Ar$^a$— where R is an alkylene and Ar$^a$ is an arylene (i.e., an alkylene is bonded to an arylene).

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The term "alkarylene" refers to a divalent group that is an arylene group substituted with an alkyl group or an arylene group attached to an alkylene group. Unless otherwise indicated, the alkarylene group typically has from 1 to 20 carbon atoms, 4 to 14 carbon atoms, 1 to 10 carbon atoms, 1 to 6 carbon atoms, or 1 to 4 carbon atoms. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms. In certain embodiments, the arylene group or the alkarylene group has 4 to 14 carbon atoms.

The term "aprotic" refers to a component that does not have a hydrogen atom bound to an oxygen (as in a hydroxyl group) or a nitrogen (as in an amine group). In general terms, any component that does not contain labile H+ is called an aprotic component. The molecules of such components cannot donate protons (H+) to other components.

The term "carbamate" refers to a compound having the general formula R—N(H)—C(O)—O—R'. Preferred R groups include alkylene groups.

The term "diisocyanate" refers to a compound having the general formula O=C=N—R—N=C=O. Preferred R groups include alkylene and arylene groups.

The term "diol" refers to a compound with two OH groups.

The term "triamine" refers to a compound with three amino groups.

The term "polyester" refers to repeating difunctional polymer wherein the repeat units are joined by ester linkages. Ester groups have the general formula —R—C(O)—OR'. The term "polyether" refers to repeating difunctional alkoxy radicals having the general formula —O—R—. Preferred R and R' groups have the general formula —C$_n$H$_{2n}$— and include, for example, methylene, ethylene and propylene (including n-propylene and i-propylene) or a combination thereof. Combinations of R and R' groups may be provided, for example, as random or block type copolymers.

The term "polyol" refers to a compound with two or more hydroxyl (i.e., OH) groups.

The term "polymeric material" refers to any homopolymer, copolymer, terpolymer, and the like.

The term "non-reactive diluent" refers to a component that can be added to adjust the viscosity of the polymerizable composition. By "non-reactive" it is meant that the diluent does not participate in a polymerization reaction (e.g., with an amine, a uretdione-containing material, or a hydroxyl-containing compound having one or more OH groups), of the polymerizable composition. The diluent does not react with such components during manufacture of a two-part composition, during manufacture of a coating or adhesive, during application of the coating or adhesive to a substrate, or upon aging. Typically, the diluent is substantially free of reactive groups. In some embodiments, the molecular weight of the (e.g., unreactive) diluent is less than the molecular weight of components such as the uretdione-containing material. The non-reactive diluent is not volatile, and substantially remains in the coating or adhesive after curing. The boiling point of the non-reactive diluent may be greater than 200° C.

The term "primary alcohol" refers to an alcohol in which the OH group is connected to a primary carbon atom (e.g., having the general formula —CH$_2$OH). The term "secondary alcohol" refers to an alcohol in which the OH group is connected to a secondary carbon atom (e.g., having the general formula —CHROH, where R is a group containing a carbon atom).

The term "ambient temperature" refers to a temperature in the range of 20 degrees Celsius to 25 degrees Celsius, inclusive.

In a first aspect, a polymeric material is provided. The polymeric material includes a reaction product of a polymerizable composition and has a solids content of 90% or greater. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. Stated another way, the first aspect provides:

A polymeric material comprising a reaction product of a polymerizable composition, the polymerizable composition comprising:

a. a uretdione-containing material comprising a reaction product of a diisocyanate reacted with itself;

b. a first hydroxyl-containing compound having a single OH group, wherein the first hydroxyl-containing compound is a primary alcohol or a secondary alcohol; and c. a second hydroxyl-containing compound having more than one OH group;

wherein the polymeric material comprises a solids content of 90% or greater. Often, the second hydroxyl-containing compound is a diol and the reaction product comprises 0.2 to 0.5, inclusive, of diol equivalents relative to isocyanate equivalents.

A uretdione can be formed by the reaction of a diisocyanate with itself and has the following general formula:

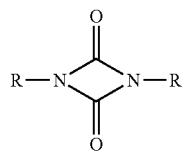

In some embodiments, the diisocyanate comprises a functional group selected from Formula X, Formula XI, and Formula XII:

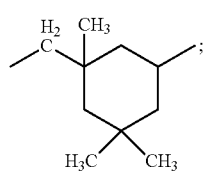

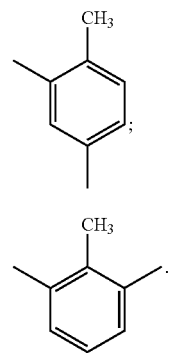

There are a variety of reaction products that can occur as a diisocyanate reacts with itself, and typically the reaction of a diisocyanate with itself results in a blend of two or more reaction products. Preferably, the reaction of a diisocyanate with itself proceeds to a degree such that the polymeric material contains 25% by weight or less or 23% by weight or less of isocyanate groups, as determined by infrared Fourier Transform spectroscopy (e.g., a Nicolet 6700 FT-IP Spectrometer, Thermo Scientific (Madison, Wis.)) where the weight percent of isocyanate in a material is calculated as the moles of isocyanate functional groups multiplied by 42 grams per mole (g/mol) and divided by the mass of the material.

In certain embodiments, the uretdione-containing material comprises a compound of Formula I:

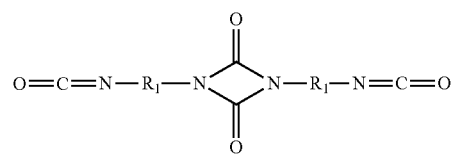

wherein R$_1$ is independently selected from a C$_4$ to C$_{14}$ alkylene, arylene, and alkaralyene. In some embodiments, the diisocyanate comprises hexamethylene diisocyanate. One preferable uretdione-containing material is a hexamethylene diisocyanate-based blend of materials comprising uretdione functional groups, commercially available under the trade name DESMODUR N3400 from Covestro (Leverkusen, Germany). Additional uretdione-containing materials are commercially available under the trade name CRELAN EF 403 also from Covestro, and under the trade name METALINK U/ISOQURE TT from Isochem Incorporated (New Albany, Ohio).

Typically, the polymeric material comprises greater than one uretdione functional group in a backbone of the polymeric material, such as an average of 1.1 or greater of a uretdione functional group in a backbone of the polymeric material, 1.2 or greater, 1.3 or greater, 1.4 or greater, 1.5 or greater, 1.6 or greater, or 1.7 or greater; and 2.5 or less of a uretdione functional group in a backbone of the polymeric material, 2.4 or less, 2.3 or less, 2.2 or less, 2.1 or less, 2.0 or less, 1.9 or less, or even 1.8 or less of a uretdione functional group in a backbone of the polymeric material. Stated another way, the polymeric material may comprise 1.3 to 2.5, inclusive, or 1.5 to 1.8, inclusive, of a uretdione functional group in a backbone of the polymeric material.

The amount of the uretdione functional group can be determined as described in the Examples below.

One exemplary simplified general reaction scheme of a uretdione-containing material with a first-hydroxyl-containing compound and a second hydroxyl-containing compound is provided below in Scheme 1:

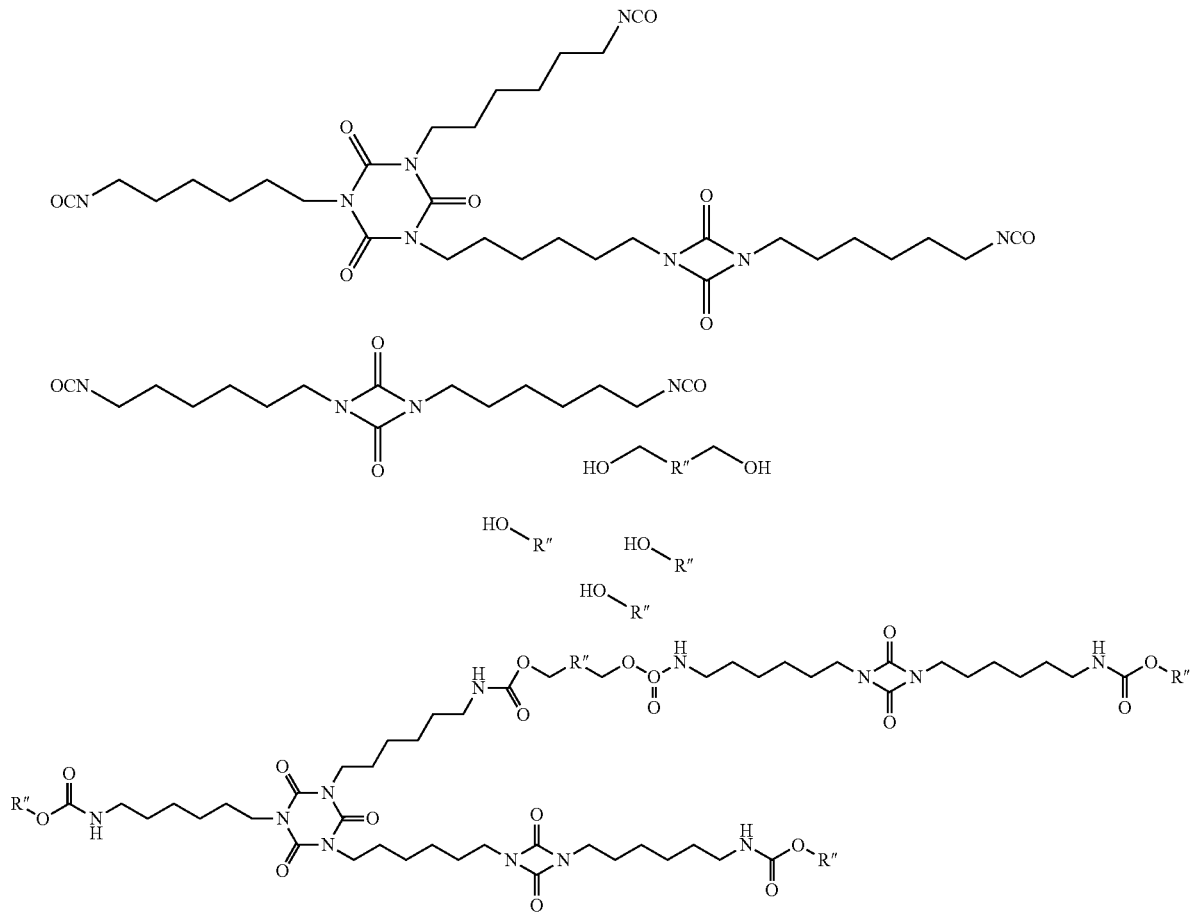

In the particular reaction scheme of Scheme 1, the uretdione-containing material comprises two compounds containing uretdione groups, one of which also contains an isocyanurate compound. In certain embodiments of the polymeric material, the polymeric material comprises an average of 1.3 or fewer isocyanurate units per molecule of the polymeric material. This can be because isocyanurate units may not contribute desirable properties to the polymeric material.

The polymeric material also typically comprises one or more carbamate functional groups per molecule of the polymeric material in a backbone of the polymeric material. The carbamate functional groups are formed by the reaction of the first and the second hydroxyl-containing compounds with the isocyanate groups present on uretdione-containing compounds. For example, the polymeric material may comprise an average of 2 or greater of carbamate functional groups in the backbone of the polymeric material, 2.5 or greater, 3 or greater, 4 or greater, 5 or greater, or even an average of 6 or greater of carbamate functional groups in the backbone of the polymeric material; and an average of 15 or less of carbamate functional groups in the backbone of the polymeric material, 10 or less, 9 or less, 8 or less, 7 or less, or even an average of 6 or less of carbamate functional groups in the backbone of the polymeric material. Stated another way, the polymeric material may comprise an average of 2 to 15, inclusive, or 2 to 10, inclusive, of carbamate functional groups in the backbone of the polymeric material. The average carbamate functional group content of the polymeric material can be determined as described in the Examples below.

In certain embodiments, the first hydroxyl-containing compound is an alkyl alcohol, a polyester alcohol, or a polyether alcohol, such as a branched alcohol and/or a secondary alcohol. For example, in some embodiments the first hydroxyl-containing compound is of Formula II:

wherein $R_2$ is selected from $R_3$, $R_4$, and a $C_1$ to $C_{50}$ alkyl;

wherein $R_3$ is of Formula III:

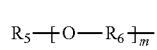

wherein m=1 to 20, $R_5$ is an alkyl, and $R_6$ is an alkylene;

wherein $R_4$ is of Formula IV:

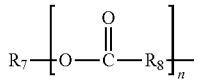
IV wherein n=1 to 20, $R_7$ is an alkyl, and $R_8$ is an alkylene. Preferably, $R_2$ is a $C_4$-$C_{20}$ alkyl, as the alkyl groups below $C_4$ have a tendency to form a crystalline polymeric material.

Suitable first hydroxyl-containing compounds can include branched alcohols or secondary alcohols, for instance and without limitation, 2-butanol, 2-ethyl-1-hexanol, isobutanol, and 2-butyl-octanol, each of which is commercially available from Alfa Aesar (Ward Hill, Mass.).

In certain embodiments, the second hydroxyl-containing compound is an alkylene polyol, a polyester polyol, or a polyether polyol. Often the second hydroxyl-containing compound is a diol, such as a branched diol. For example, in some embodiments the second hydroxyl-containing compound is of Formula V:

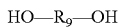
V wherein $R_9$ is selected from $R_{10}$, an alkylene, and an alkylene substituted with an OH group, wherein $R_{10}$ is of Formula VI or Formula VII:

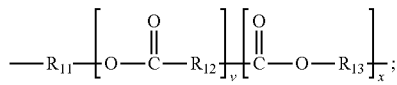
VI

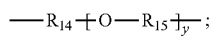
VII wherein each of $R_{11}$, $R_{12}$, $R_{13}$, $R_{14}$, and $R_{15}$ is independently selected from an alkylene, wherein each of v and y is independently selected from 1 to 40, and wherein x is selected from 0 to 40. Optionally, $R_9$ is selected from $C_1$ to $C_{20}$ alkylene and a $C_1$ to $C_{20}$ alkylene substituted with an OH group.

In certain embodiments of the second hydroxyl-containing compound, each of $R_{11}$, $R_{12}$, $R_{13}$, $R_{14}$, and $R_{15}$ is independently selected from a $C_1$ to $C_{20}$ alkylene. Alternatively, the second hydroxyl-containing compound can be of Formula VIII or Formula IX:

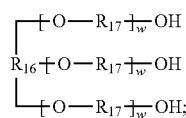
VIII

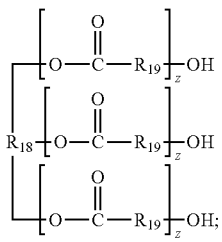
IX wherein each of $R_{16}$ and $R_{18}$ are independently selected from an alkane-triyl, wherein each of $R_{17}$ and $R_{19}$ is independently selected from an alkylene, and wherein each of w and z is independently selected from 1 to 20. Preferably, each of $R_{17}$ and $R_{19}$ is independently selected from a $C_1$ to $C_{20}$ alkylene.

Suitable second hydroxyl-containing compounds include branched alcohols, secondary alcohols, or ethers, for instance and without limitation, 2,2-dimethyl-1,3-propanediol, 2-methyl-1,3-propanediol, diethylene glycol, poly(tetramethylene ether) glycol, 2-ethylhexane-1,3-diol, and 1,3-butanediol. Such suitable second hydroxyl-containing compounds are commercially available from chemical suppliers including for example, Alfa Aesar (Ward Hill, Mass.), JT Baker (Center Valley, Pa.), TCI (Portland, Oreg.), and Fisher Scientific (Waltham, Mass.).

In an embodiment, the first hydroxyl-containing compound is of Formula II and the second hydroxyl-containing compound is of Formula V, wherein $R_9$ of the compound of Formula V is of Formula VI, and wherein $R_2$ of the compound of Formula II is a branched $C_4$ to $C_{20}$ alkyl. In select embodiments, the second hydroxyl-containing compound is a diol and the reaction product comprises 0.2 to 0.5, inclusive, or 0.2 to 0.35, inclusive, of diol equivalents relative to isocyanate equivalents.

Optionally, a sum of the OH equivalents of the first hydroxyl-containing compound and the second hydroxyl-containing compound is equal to or greater than the isocyanate equivalents of the polymeric material.

Preferably, the polymeric material is essentially free of isocyanates. By "essentially free of isocyanates" it is meant that the polymeric material contains 5% by weight or less, 4% by weight or less, 3% by weight or less, 2% by weight or less, or 1% by weight or less of isocyanate groups, as determined by infrared Fourier Transform spectroscopy (e.g., a Nicolet 6700 FT-IP Spectrometer, Thermo Scientific (Madison, Wis.)), where the weight percent of isocyanate in a material is calculated as the moles of isocyanate functional groups multiplied by 42 g/mol and divided by the mass of the material.

Two-part compositions according to the present disclosure use the basic chemical reaction from Scheme 2 below, i.e., a polymeric material comprising a uretdione-containing material in one part of the system and a multifunctional amine in the other part of the system. When the amine curative is mixed with the uretdione-containing material, the amine opens the uretdione to form a biuret. This produces an isocyanate-free coating or adhesive system according to Scheme 2:

Scheme 2

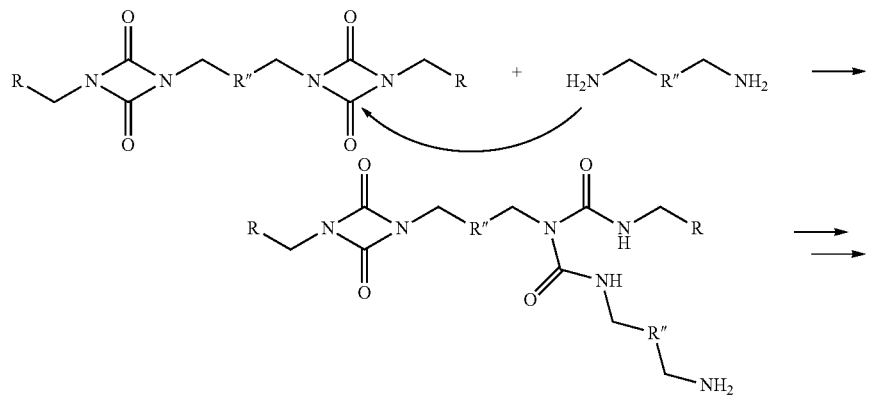

The polymeric material may further comprise one or more additives, e.g., catalysts, plasticizers, non-reactive diluents, fillers, etc. For example, suitable catalysts can include tertiary amines or organometallic catalysts such as tin compounds, bismuth compounds, zinc compounds, and zirconium compounds. In some cases, each of bismuth neodecanoate and bismuth ethyl hexanoate is suitable. Either catalysts or retarders can be added to change the cure profile of the amine with the polymeric material. They can be included in either part of a two-part composition; with the polymeric material or with the amine. These additives can comprise one or more components, e.g., catalysts, plasticizers, non-reactive diluents, fillers, etc. For example, suitable catalysts can include tertiary amines, amidines or organometallic catalysts. Additionally, organic and/or inorganic acids can be utilized as retarders to delay the cure or extend the pot-life of the material. For example, suitable acids can include carboxylic acids.

A plasticizer is often added to a polymeric material to make the polymeric material more flexible, softer, and more workable (e.g., easier to process). More specifically, the mixture resulting from the addition of the plasticizer to the polymeric material typically has a lower glass transition temperature compared to the polymeric material alone. The glass transition temperature of a polymeric material can be lowered, for example, by at least 30 degrees Celsius, at least 40 degrees Celsius, at least 50 degrees Celsius, at least 60 degrees Celsius, or at least 70 degrees Celsius by the addition of one or more plasticizers. The temperature change (i.e., decrease) tends to correlate with the amount of plasticizer added to the polymeric material. It is the lowering of the glass transition temperature that usually leads to the increased flexibility, increased elongation, and increased workability. Some example plasticizers include various phthalate esters such as diethyl phthalate, diisobutyl phthalate, dibutyl phthalate, diisoheptyl phthalate, dioctyl phthalate, diisooctyl phthalate, dinonyl phthalate, diisononyl phthalate, diisodecyl phthalate, and benzylbutyl phthalate; various adipate esters such as di-2-ethylhexyl adipate, dioctyl adipate, diisononyl adipate, and diisodecyl adipate; various phosphate esters such as tri-2-ethylhexyl phosphate, 2-ethylhexyl diphenyl phosphate, trioctylphosphate, and tricresyl phosphate; various trimellitate esters such as tris-2-ethylhexyl trimellitate and trioctyl trimellitate; various sebacate and azelate esters; and various sulfonate esters. Other example plasticizers include polyester plasticizers that can be formed by a condensation reaction of propanediols or butanediols with adipic acid.

In certain embodiments, the polymeric material is used in an application where it is disposed between two substrates, wherein solvent removal (e.g., evaporation) is restricted, especially when one or more of the substrates comprises a moisture impermeable material (e.g., steel or glass). In such cases, the polymeric material comprises a solids content of 90% or greater, 92% or greater, 94% or greater, 95% or greater, 96% or greater, 98% or greater, or 99% or greater. Likewise, in such embodiments where solvent removal is restricted, the first part, the second part, or both parts of a two-part composition according to the present disclosure comprises a solids content of 90% or greater, 92% or greater, 94% or greater, 95% or greater, 96% or greater, 98% or greater, or 99% or greater. Components that are considered "solids" include, for instance and without limitation, polymers, oligomers, monomers, hydroxyl-containing compounds, and additives such as plasticizers, catalysts, non-reactive diluents, and fillers. Typically, only solvents do not fall within the definition of solids, for instance water or organic solvents.

For convenient handleability, the polymeric material typically comprises a dynamic viscosity of 10 Poise (P) or greater as determined using a Brookfield viscometer, 50 P or greater, 100 P or greater, 150 P or greater, 250 P or greater, 500 P or greater, 1,000 P or greater, 1,500 P or greater, 2,000 P or greater, 2,500 P or greater, or even 3,000 P or greater; and 10,000 P or less, 9,000 P or less, 8,000 P or less, 7,000 P or less, 6,000 P or less, 5,000 P or less, or even 4,000 P or less, as determined using a Brookfield viscometer. Stated another way, the polymeric material may exhibit a dynamic viscosity of 10 Poise (P) to 10,000 P, inclusive, or 10 P to 4,000 P, inclusive, as determined using a Brookfield viscometer. Conditions for the dynamic viscosity test include use of a LV4 spindle at a speed of 0.3 or 0.6 revolutions per minute (RPM) at 24 degrees Celsius.

The polymerizable compositions are often in the form of a two-part composition. Hence, in a second aspect, a two-part composition is provided. The two-part composition includes a first part including a polymeric material including a reaction product of a polymerizable composition; and a second part including at least one amine. The polymerizable composition includes a uretdione-containing material including a reaction product of a diisocyanate reacted with itself; a first hydroxyl-containing compound having a single OH group; and a second hydroxyl-containing compound having more than one OH group. The first compound is a primary alcohol or a secondary alcohol.

The at least one amine has an average amine functionality of 2.0 or greater and each amine is a primary amine or a secondary amine. Some primary amines, such as diethylenetriamine and other oligomers of ethylenediamine are not preferred because they exhibit a reactivity that is too swift to achieve mixing and application of the adhesive before polymerization of two-part compositions has occurred according to the present disclosure. For example, some steric hindrance of the amine is helpful to decrease the reaction rate to a suitable speed for essentially complete reaction of the first part with the second part. The average functionality is relevant, thus the second part can include a mixture of amines with different functionalities as long as the average is 2.0 or greater. Preferably, the average functionality is greater than 2.0 (such as 3.0 or greater). Moreover, if the amine is not sufficiently miscible with the first part of the two-part composition, (e.g., tends to separate from the first part upon mixture of the first part and the second part of a two-part composition), then that amine is not suitable for reaction with that first part. It has been found that many primary aliphatic amines (e.g., an amine group located on an alkane group) react too swiftly with uretdione-containing materials to allow essentially complete reaction of the two-part composition according to at least certain embodiments of the present disclosure.

In certain embodiments, a two-part composition comprises:
a. a first part comprising a polymeric material comprising a reaction product of a polymerizable composition, the polymerizable composition comprising:
   i. a uretdione-containing material comprising a reaction product of a diisocyanate reacted with itself;
   ii. a first hydroxyl-containing compound having a single OH group, wherein the first compound is a primary alcohol or a secondary alcohol; and
   iii. a second hydroxyl-containing compound having more than one OH group;
wherein the polymeric material comprises a solids content of 90% or greater; and
b. a second part comprising at least one amine, the at least one amine having an average amine functionality of 2.0 or greater, wherein each amine is a primary amine or a secondary amine.

Typically, the polymeric material comprises an average of 1.3 to 2.5, inclusive, of a uretdione functional group in a backbone of the polymeric material. It is usually advantageous for the first part (e.g., the polymeric material, the first hydroxyl-containing compound, and the second hydroxyl-containing compound) to be flowable, (e.g., to allow for mixing with the second part) and to readily wet the surface of either a substrate to be coated or two substrates to be adhered. To provide a uretdione-containing polymeric material that has a relatively low viscosity at a high solids content, the composition of the polymeric material should have minimal crystallinity and a sufficiently low molecular weight. However, the polymeric material also needs to have enough of a uretdione group functionality per molecule of polymeric material to allow for curing of a two-part composition into an effective polymer network when reacted with an amine. In published reports, uretdione-containing materials used in solvent-borne coatings have had a molecular weight that is too high be practical in the adhesive systems according to the present disclosure. For example, U.S. Pat. No. 5,814,689 (Goldstein et al.) teaches that a diol (e.g., a hydroxyl-containing compound having two OH groups) should be included in a range of 0.5 to 1.0 equivalents relative to isocyanate equivalents, and that the total weight of alcohols should be 40% or less mono-hydroxyl compound (e.g., hydroxyl-containing compounds having a single OH group). However, it has been found that such a high of ratio of diols in a first part produces a viscosity that is typically too high in undiluted form (e.g., without added solvent) to produce a manageable coating or adhesive. In contrast to U.S. Pat. No. 5,814,689, it has been found that the amount of diol in a first part of a two-part composition can be included in a range of about 0.2 to 0.5 equivalents relative to the isocyanate equivalents to achieve a suitable viscosity and a sum of the OH equivalents of the first hydroxyl-containing compound and the second hydroxyl-containing compound is equal to or greater than the isocyanate equivalents of the polymeric material.

Moreover, U.S. Pat. No. 5,814,689 additionally teaches that a uretdione-containing material can have from 3 to 10 uretdione rings per polymer chain. This range of uretdione functionality is due to a high amount of diol content relative to the content of hydroxyl-containing compounds having a single OH group in a first part of a two-part composition. In contrast, the (e.g., undiluted) polymer chains of uretdione-containing compounds according to the present disclosure have lower amounts of diol relative to hydroxyl-containing compounds having a single OH group, and as a result, the polymeric materials have only 1.3 to 2.5 uretdione rings per polymer chain.

Because polymeric materials according to the present disclosure have a relatively low uretdione functionality, they should be paired with curing agents that are different from prior disclosed systems. For example, they should be paired with second parts having amines with a functionality that is greater than 2.0, to produce better properties, such as adhesive strength and gel content. Previous reports, for instance, teach that primary amines give a rapid cure of uretdione-containing material that limits pot life, and it has been found that that is the case with certain amines, such as diethylenetriamine and other ethylenediamine oligomers. Interestingly, it has been found that polymeric materials according to the present disclosure cure to a soft, poorly crosslinked material when cured with diamines. However, it has also been found that amine-terminated polyethers (e.g., available under the trade name "JEFFAMINE" commercially available from Huntsman (The Woodlands, Tex.)) produce an acceptable rate of cure, particularly when they are primary amines. Trifunctional JEFFAMINE amines, such as JEFFAMINE T403, have been found to produce particularly good performance in adhesive systems according to the present disclosure. Extremely high molecular weight amines tend to not provide good miscibility with the polymeric material of the first part, however, and the apparent phase separation of the uretdione-containing material and the amine curing agent tends to prevent effective cure. The relatively high molecular weight of JEFFAMINE curing agents provide another advantage over small-molecule diamines: the JEFFAMINES require a weight ratio between the curing agent and the uretdione-containing material that is higher, and a balanced mixture ratio (e.g., the more closely it approaches 50 wt. % of each component) is often more convenient for two-part compositions.

It has further been found that because the polymeric material comprises a relatively low uretdione functionality, the one or more amines present in the second part should have an average amine functionality of 2.0 or greater, 2.1 or greater, 2.2 or greater, 2.3 or greater, 2.4 or greater, 2.5 or greater, 2.6 or greater, 2.7 or greater, 2.8 or greater, 2.9 or greater, 3.0 or greater, 3.1 or greater, 3.2 or greater, 3.3 or greater, 3.4 or greater, or even 3.5 or greater; and an average amine functionality of 4.0 or less. The average amine functionality of 2.0 or greater tends to result in more desirable properties of the polymerized product after curing with the amine curing agent, such as gel content and The first part can include other components that do not react with the uretdione-containing material (or that react with only a portion of the uretdione-containing material). Likewise, the second part can include other components that do not react with the amine curing agent or that react with only a portion of the amine curing agent. When the first part and the second part are mixed together, the various components react to form the reaction product, for instance as shown below in the general reaction Scheme 3:

Scheme 3

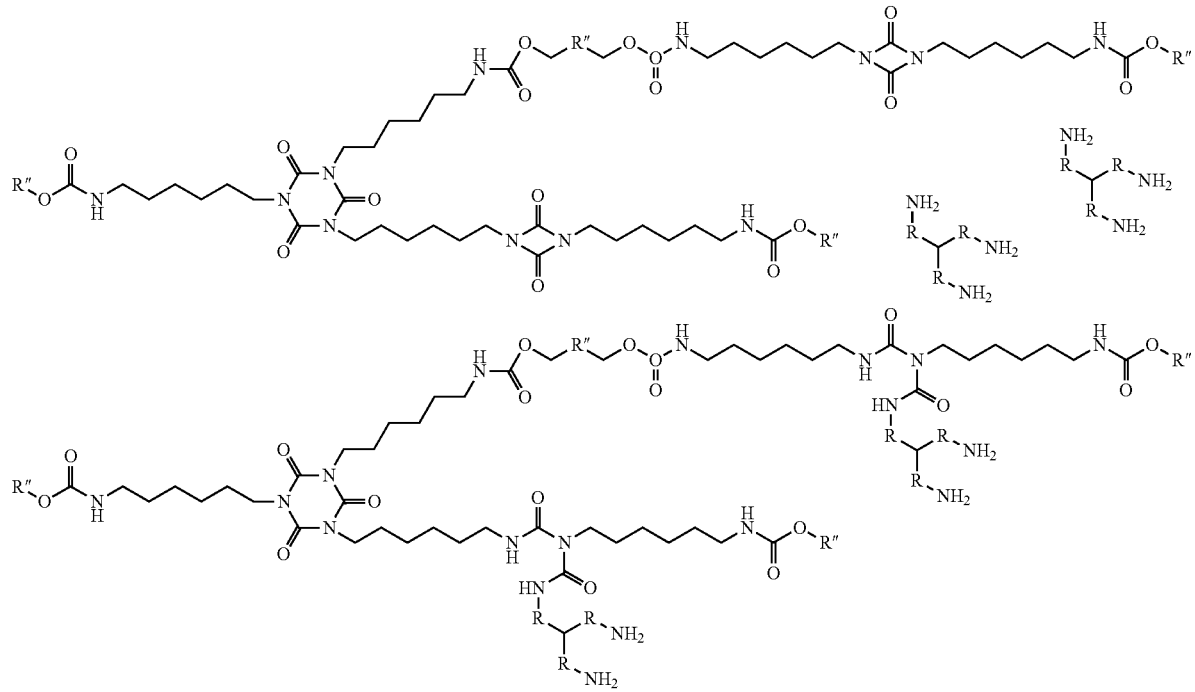

adhesive strength. Moreover, the average amine functionality may be selected based on whether a desired application requires, e.g., stiffness versus elasticity; or high $T_g$ versus low $T_g$.

In certain embodiments, the second part includes a triamine, such as a trifunctional amine-terminated polyether. Another suitable amine for use in the second part comprises a reaction product of epichlorohydrin with 1,3-benzenedimethanamine. The at least one amine often comprises a molecular weight of 2,000 grams per mole (g/mole) or less, 1,800 g/mole or less, 1,600 g/mole or less, 1,500 g/mole or less, 1,400 g/mole or less, 1,200 g/mole or less, or even 1,000 g/mole or less.

It has been discovered that it is possible to provide two-part compositions (according to at least certain embodiments of the present disclosure) that are 90% or greater solids and exhibit each of 1) good flowability; 2) acceptable extent of cure; and 3) curing in a relatively short amount of time. Adhesive two-part compositions can further exhibit 4) acceptable adhesion strength following curing.

The uretdione-containing material is typically kept separate from the curing agent prior to use of the polymerizable composition. That is, the uretdione-containing material is typically in a first part and the amine curing agent is typically in a second part of the polymerizable composition.

In a third aspect, a polymerized product is provided. The polymerized product is the polymerized product of any of the two-part compositions according to the second aspect described above. The polymerized product typically coats at least a portion of a substrate, and up to the entire surface of a substrate depending on the application. When the polymerized product acts as an adhesive, often the polymerized product is disposed between two substrates (e.g., adhering the two substrates together). Advantageously, the polymerized product of at least some embodiments of the disclosure is suitable for use when at least one substrate comprises a moisture impermeable material, due to the high solids content of the polymerizable composition. Hence, in certain embodiments at least one substrate is made of a metal (e.g., steel), a glass, a wood, a ceramic, or a polymeric material. The polymerized product may also be employed with one or more substrates that have moisture permeability, for instance but without limitation, woven materials, nonwoven materials, paper, foams, membranes, and polymeric films.

In a fourth aspect, a method of adhering two substrates is provided. Referring to FIG. 1, the method includes obtaining a two-part composition 110; combining at least a portion of the first part with at least a portion of the second part to form a mixture 120; disposing at least a portion of the mixture on a first major surface of a first substrate 130; and contacting a first major surface of a second substrate with the mixture disposed on the first substrate 140. The two-part composition includes a first part including a polymeric material including a reaction product of a polymerizable composition; and a second part including at least one amine. The at least one amine has an average amine functionality of 2.0 or greater, and each amine is a primary amine or a secondary amine. The polymerizable composition includes a uretdione-containing material including a reaction product of a diisocyanate reacted with itself; a first hydroxyl-containing compound having a single OH group; and a second hydroxyl-containing compound having more than one OH group. The first compound is a primary alcohol or a secondary alcohol. The polymeric material has a solids content of 90% or greater. Typically, the polymeric material comprises an average of 1.3 to 2.5, inclusive, of a uretdione functional group in a backbone of the polymeric material.

Referring again to FIG. 1, the method optionally further comprises securing the first substrate to the second substrate (e.g., with one or more mechanical clamps, under a weighted object, etc.) and allowing the mixture to cure to form an adhesive adhering the first substrate and the second substrate together 150. The method optionally further comprises allowing the mixture to cure for at least 12 hours at ambient temperature to form an adhesive adhering the first substrate and the second substrate together 160. In contrast to some other available two-part compositions that are recommended to be allowed to cure for at least 24 hours (or at least 2 days, at least 4 days, at least 7 days, or at least 2 weeks), the present disclosure provides two-part compositions that are allowed to cure for 10 hours or more, 12 hours or more, 14 hours or more, 16 hours or more, or 18 hours or more; and up to 30 hours, up to 28 hours, up to 26 hours, up to 24 hours, up to 22 hours, or up to 20 hours. In some embodiments, the mixture of the first part and the second part is allowed to cure for 10 to 22 hours or 12 to 20 hours.

Stated another way, a method of adhering two substrates together comprises:
 a. obtaining a two-part composition, the two-part composition comprising:
  i. a first part comprising a polymeric material comprising a reaction product of a polymerizable composition, the polymerizable composition comprising:
   1. a uretdione-containing material comprising a reaction product of a diisocyanate reacted with itself;
   2. a first hydroxyl-containing compound having a single OH group, wherein the first compound is a primary alcohol or a secondary alcohol; and
   3. a second hydroxyl-containing compound having more than one OH group;
   wherein the polymeric material comprises a solids content of 90% or greater; and
  ii. a second part comprising at least one amine, the at least one amine having an average amine functionality of 2.0 or greater, wherein each amine is a primary amine or a secondary amine;
 b. combining at least a portion of the first part with at least a portion of the second part to form a mixture;
 c. disposing at least a portion of the mixture on a first major surface of a first substrate; and
 d. contacting a first major surface of a second substrate with the mixture disposed on the first substrate.

Depending on the particular application, an amount of each of the first part and the second part obtained will vary; in certain embodiments, an excess of one or both of the first part and the second part is obtained and hence only a portion of one or both of the first part and the second part, respectively, will be combined to form a mixture. In other embodiments, however, a suitable amount of each of the first part and the second part for adhering the first and second substrates together is obtained and essentially all of the first part and the second part is combined to form the mixture. In certain embodiments, combining a (e.g., predetermined) amount of the first part with a (e.g., predetermined) amount of the second part is performed separately from the first and second substrates, while in other embodiments the combining is performed (e.g., directly) on the first major surface of a substrate.

The mixture is typically applied to (e.g., disposed on) the surface of the substrate using conventional techniques such as, for example, dispensing, bar coating, roll coating, curtain coating, rotogravure coating, knife coating, spray coating, spin coating, or dip coating techniques. Coating techniques such as bar coating, roll coating, and knife coating are often used to control the thickness of a layer of the mixture. In certain embodiments, the disposing comprises spreading the mixture on the first major surface of the first substrate, for instance when the mixture is dispensed (e.g., with a nozzle, etc.) on the surface of the substrate such that the mixture does not cover the entirety of a desired area.

Figure 2:
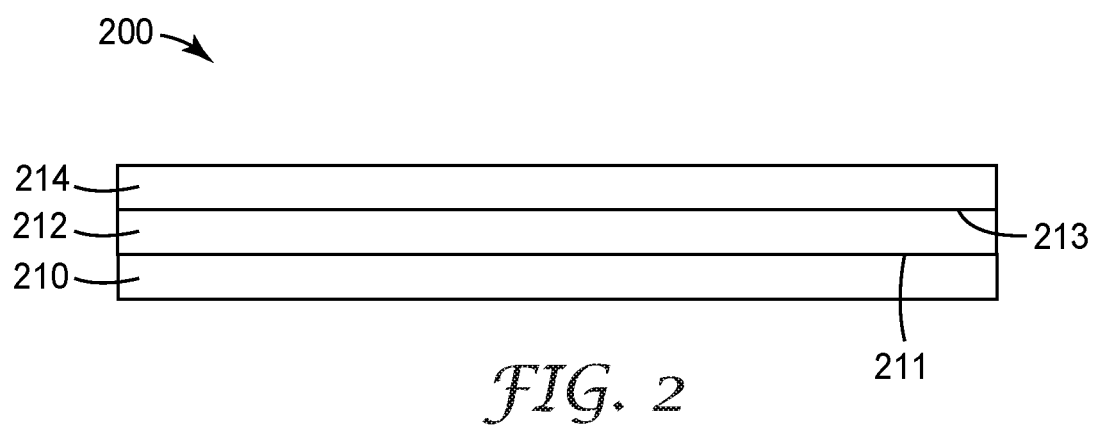
FIG. 2 is a schematic cross-sectional view of an exemplary article including two substrates adhered together, preparable according to the present disclosure.

Referring to FIG. 2, a schematic cross-section of an article 200 is illustrated. The article 200 comprises a mixture 212 (e.g., an adhesive) disposed on a first major surface 211 of a first substrate 210. The article 200 further comprises a first major surface 213 of a second substrate 214 in contact with (e.g., adhered to) the mixture 212 disposed on the first substrate 210.

Advantageously, the two-part compositions according to at least certain embodiments of the present disclosure are capable of providing at least a minimum adhesion of two substrates together. Following cure, the adhesive preferably exhibits a minimum overlap shear on aluminum of 0.3 megaPascals (MPa), 1 MPa, 5 MPa, 10 MPa, 25 MPa, or 50 MPa. A suitable test for determining the minimum overlap shear is described in the Examples below.

In a fifth aspect, a method of making a two-part composition is provided. The method includes providing a first part by forming a polymeric material including a reaction product of a polymerizable composition; and providing a second part including at least one amine. The at least one amine has an average amine functionality of 2.0 or greater and each amine is a primary amine or a secondary amine. The polymeric material has a solids content of 90% or greater. The polymerizable composition includes a uretdione-containing material including a reaction product of a diisocyanate reacted with itself; a first hydroxyl-containing compound having a single OH group; and a second hydroxyl-containing compound having more than one OH group. The first compound is a primary alcohol or a secondary alcohol. Often the polymeric material comprises an average of 1.3 to 2.5, inclusive, of a uretdione functional group in a backbone of the polymeric material.

Stated another way, a method of making a two-part composition comprises:
 a. providing a first part by forming a polymeric material comprising a reaction product of a polymerizable composition, the polymerizable composition comprising:
  i. a uretdione-containing material comprising a reaction product of a diisocyanate reacted with itself;
  ii. a first hydroxyl-containing compound having a single OH group, wherein the first compound is a primary alcohol or a secondary alcohol; and
  iii. a second hydroxyl-containing compound having more than one OH group;

wherein the polymeric material comprises a solids content of 90% or greater; and b. providing a second part comprising at least one amine, the at least one amine having an average amine functionality of 2.0 or greater, wherein each amine is a primary amine or a secondary amine.

The amine of the second part is as described above with respect to the fourth aspect.

Select Embodiments of the Disclosure

Embodiment 1 is polymeric material. The polymeric material comprises a reaction product of a polymerizable composition and has a solids content of 90% or greater. The polymerizable composition comprises a uretdione-containing material comprising a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol.

Embodiment 2 is the polymeric material of embodiment 1, wherein the first hydroxyl-containing compound is an alkyl alcohol, a polyester alcohol, or a polyether alcohol.

Embodiment 3 is the polymeric material of embodiment 1 or embodiment 2, wherein the second hydroxyl-containing compound is an alkylene polyol, a polyester polyol, or a polyether polyol.

Embodiment 4 is the polymeric material of any of embodiments 1 to 3, wherein the uretdione-containing material comprises a compound of Formula I:

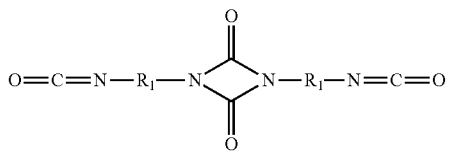

I wherein $R_1$ is independently selected from a $C_4$ to $C_{14}$ alkylene, arylene, and alkaralyene.

Embodiment 5 is the polymeric material of any of embodiments 1 to 4, wherein the first hydroxyl-containing compound is of Formula II:

$R_2$—OH  II wherein $R_2$ is selected from $R_3$, $R_4$, and a $C_1$ to $C_{50}$ alkyl; wherein $R_3$ is of Formula III:

III wherein m=1 to 20, $R_5$ is an alkyl, and $R_6$ is an alkylene; wherein $R_4$ is of Formula IV:

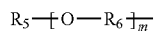

IV wherein n=1 to 20, $R_7$ is an alkyl, and $R_8$ is an alkylene.

Embodiment 6 is the polymeric material of any of embodiments 1 to 5, wherein the second hydroxyl-containing compound is of Formula V:

HO—$R_9$—OH  V wherein $R_9$ is selected from $R_{10}$, an alkylene, and an alkylene substituted with an OH group, wherein $R_{10}$ is of Formula VI or Formula VII:

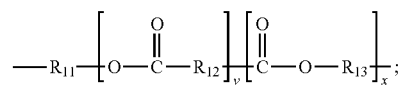

VI

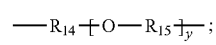

VII wherein each of $R_{11}$, $R_{12}$, $R_{13}$, $R_{14}$, and $R_{15}$ is independently selected from an alkylene, wherein each of v and y is independently selected from 1 to 40, and wherein x is selected from 0 to 40.

Embodiment 7 is the polymeric material of embodiment 6, wherein $R_9$ is selected from $C_1$ to $C_{20}$ alkylene and a $C_1$ to $C_{20}$ alkylene substituted with an OH group.

Embodiment 8 is the polymeric material of embodiment 6 or embodiment 7, wherein each of $R_{11}$, $R_{12}$, $R_{13}$, $R_{14}$, and $R_{15}$ is independently selected from a $C_1$ to $C_{20}$ alkylene.

Embodiment 9 is the polymeric material of any of embodiments 1 to 5, wherein the second hydroxyl-containing compound is of Formula VIII or Formula IX:

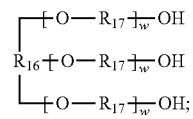

VIII

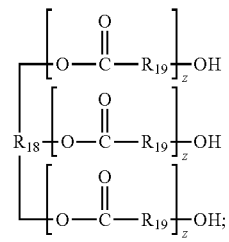

IX wherein each of $R_{16}$ and $R_{18}$ are independently selected from an alkane-triyl, wherein each of $R_{17}$ and $R_{19}$ is independently selected from an alkylene and wherein each of w and z is independently selected from 1 to 20.

Embodiment 10 is the polymeric material of embodiment 9, wherein each of $R_{17}$ and $R_{19}$ is independently selected from a $C_1$ to $C_{20}$ alkylene.

Embodiment 11 is the polymeric material of any of embodiments 1 to 10, comprising greater than one uretdione functional group in a backbone of the polymeric material.

Embodiment 12 is the polymeric material of any of embodiments 1 to 11, comprising an average of 1.3 to 2.5, inclusive, of a uretdione functional group in a backbone of the polymeric material.

Embodiment 13 is the polymeric material of any of embodiments 1 to 12, comprising an average of 1.5 to 1.8, inclusive, of a uretdione functional group in a backbone of the polymeric material.

Embodiment 14 is the polymeric material of any of embodiments 1 to 13, comprising a solids content of 94% or greater.

Embodiment 15 is the polymeric material of any of embodiments 1 to 14, comprising a solids content of 98% or greater.

Embodiment 16 is the polymeric material of any of embodiments 1 to 15, comprising an average of 0.2 to 2.0, inclusive, of a carbamate functional group in a backbone of the polymeric material.

Embodiment 17 is the polymeric material of any of embodiments 1 to 16, wherein the polymeric material is essentially free of isocyanates.

Embodiment 18 is the polymeric material of any of embodiments 1 to 17, wherein the diisocyanate comprises hexamethylene diisocyanate.

Embodiment 19 is the polymeric material of any of embodiments 1 to 18, further comprising a catalyst.

Embodiment 20 is the polymeric material of any of embodiments 1 to 19, wherein the polymeric material comprises an average of 1.3 or fewer isocyanurate units per molecule of the polymeric material.

Embodiment 21 is the polymeric material of any of embodiments 1 to 17, 19, or 20, wherein the diisocyanate comprises a functional group selected from Formula X, Formula XI, and Formula XII:

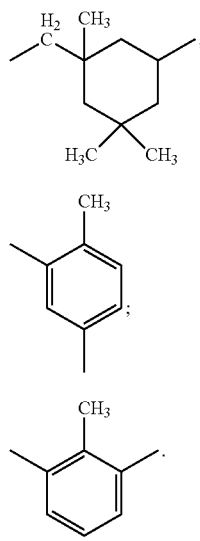

Embodiment 22 is the polymeric material of any of embodiments 1 to 21, comprising a dynamic viscosity of 10 Poise (P) to 10,000 P, inclusive, as determined using a Brookfield viscometer.

Embodiment 23 is the polymeric material of any of embodiments 1 to 22, comprising a dynamic viscosity of 10 P to 4,000 P, inclusive, as determined using a Brookfield viscometer.

Embodiment 24 is the polymeric material of any of embodiments 1 to 23, further comprising a plasticizer, a non-reactive diluent, or a combination thereof.

Embodiment 25 is the polymeric material of any of embodiments 1 to 24, wherein the first hydroxyl-containing compound is selected from 2-butanol, 2-ethyl-1-hexanol, isobutanol, and 2-butyl-octanol.

Embodiment 26 is the polymeric material of any of embodiments 1 to 25, wherein the second hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 27 is the polymeric material of any of embodiments 1 to 8 or 11 to 26, wherein the first hydroxyl-containing compound is of Formula I and the second hydroxyl-containing compound is of Formula V, wherein $R_9$ of the compound of Formula V is of Formula VI, and wherein $R_2$ of the compound of Formula II is a branched $C_4$ to $C_{20}$ alkyl.

Embodiment 28 is the polymeric material of any of embodiments 1 to 27, wherein a sum of the OH equivalents of the first hydroxyl-containing compound and the second hydroxyl-containing compound is equal to or greater than the isocyanate equivalents of the polymeric material.

Embodiment 29 is the polymeric material of any of embodiments 1 to 28, wherein the second hydroxyl-containing compound is a diol.

Embodiment 30 is the polymeric material of any of embodiments 1 to 29, wherein the second hydroxyl-containing compound is a diol and the reaction product comprises 0.2 to 0.5, inclusive, of diol equivalents relative to isocyanate equivalents.

Embodiment 31 is the polymeric material of any of embodiments 1 to 30, wherein the second hydroxyl-containing compound is a diol and the reaction product comprises 0.2 to 0.35, inclusive, of diol equivalents relative to isocyanate equivalents.

Embodiment 32 is the polymeric material of any of embodiments 1 to 31, wherein the first hydroxyl-containing compound comprises a branched alcohol.

Embodiment 33 is the polymeric material of any of embodiments 1 to 32, wherein the first hydroxyl-containing compound comprises a secondary alcohol.

Embodiment 34 is the polymeric material of any of embodiments 1 to 33, wherein the second hydroxyl-containing compound comprises a branched diol.

Embodiment 35 is the polymeric material of any of embodiments 1 to 34, wherein the catalyst comprises bismuth neodecanoate.

Embodiment 36 is a two-part composition. The two-part composition comprises a first part comprising a polymeric material comprising a reaction product of a polymerizable composition; and a second part comprising at least one amine. The polymerizable composition comprises a uretdione-containing material comprising a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The at least one amine has an average amine functionality of 2.0 or greater and each amine is a primary amine or a secondary amine. The polymeric material has a solids content of 90% or greater.

Embodiment 37 is the two-part composition of embodiment 36, wherein the at least one amine has an average amine functionality of 2.4 or greater.

Embodiment 38 is the two-part composition of embodiment 36 or embodiment 37, wherein the at least one amine comprises a triamine.

Embodiment 39 is the two-part composition of any of embodiments 36 to 38, wherein the at least one amine comprises a trifunctional amine-terminated polyether.

Embodiment 40 is the two-part composition of any of embodiments 36 to 39, wherein the at least one amine comprises a reaction product of epichlorohydrin with 1,3-benzenedimethanamine.

Embodiment 41 is the two-part composition of any of embodiments 36 to 40, wherein the at least one amine comprises a molecular weight of 2,000 grams per mole or less.

Embodiment 42 is the two-part composition of any of embodiments 36 to 41, wherein the first hydroxyl-containing compound is an alkyl alcohol, a polyester alcohol, or a polyether alcohol.

Embodiment 43 is the two-part composition of any of embodiments 36 to 42, wherein the second hydroxyl-containing compound is an alkylene polyol, a polyester polyol, or a polyether polyol.

Embodiment 44 is the two-part composition of any of embodiments 36 to 43, wherein the uretdione-containing material comprises a compound of Formula I:

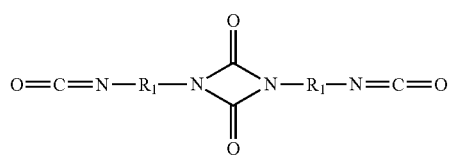

wherein $R_1$ is independently selected from a $C_4$ to $C_{14}$ alkylene, arylene, and alkaralyene.

Embodiment 45 is the two-part composition of any of embodiments 36 to 44, wherein the first hydroxyl-containing compound is of Formula II:

$R_2$—OH    II wherein $R_2$ is selected from $R_3$, $R_4$, and a $C_1$ to $C_{50}$ alkyl; wherein $R_3$ is of Formula III:

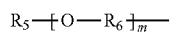

wherein m=1 to 20, $R_5$ is an alkyl, and $R_6$ is an alkylene; wherein $R_4$ is of Formula IV:

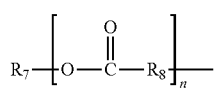

wherein n=1 to 20, $R_7$ is an alkyl, and $R_8$ is an alkylene.

Embodiment 46 is the two-part composition of any of embodiments 36 to 45, wherein the second hydroxyl-containing compound is of Formula V:

HO—$R_9$—OH    V wherein $R_9$ is selected from $R_{10}$, an alkylene, and an alkylene substituted with an OH group, wherein R10 is of Formula VI or Formula VII:

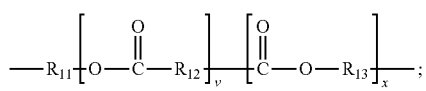

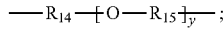

wherein each of $R_{11}$, $R_{12}$, $R_{13}$, $R_{14}$, and $R_{15}$ is independently selected from an alkylene, wherein each of v and y is independently selected from 1 to 40, and wherein x is selected from 0 to 40.

Embodiment 47 is the two-part composition of embodiment 46, wherein $R_9$ is selected from $C_1$ to $C_{20}$ alkylene and a $C_1$ to $C_{20}$ alkylene substituted with an OH group.

Embodiment 48 is the two-part composition of embodiment 46 or embodiment 47, wherein each of $R_{11}$, $R_{12}$, $R_{13}$, $R_{14}$, and $R_{15}$ is independently selected from a $C_1$ to $C_{20}$ alkylene.

Embodiment 49 is the two-part composition of any of embodiments 36 to 45, wherein the second hydroxyl-containing compound is of Formula VIII or Formula IX:

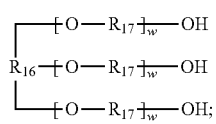

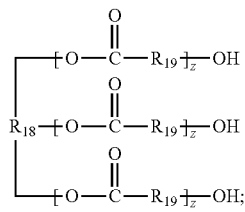

wherein each of $R_{16}$ and $R_{18}$ are independently selected from an alkane-triyl, wherein each of $R_{17}$ and $R_{19}$ is independently selected from an alkylene and wherein each of w and z is independently selected from 1 to 20.

Embodiment 50 is the two-part composition of embodiment 49, wherein each of $R_{17}$ and $R_{19}$ is independently selected from a $C_1$ to $C_{20}$ alkylene.

Embodiment 51 is the two-part composition of any of embodiments 36 to 50, comprising greater than one uretdione functional group in a backbone of the polymeric material.

Embodiment 52 is the two-part composition of any of embodiments 36 to 51, comprising an average of 1.3 to 2.5, inclusive, of a uretdione functional group in a backbone of the polymeric material.

Embodiment 53 is the two-part composition of any of embodiments 36 to 52, comprising an average of 1.5 to 1.8, inclusive, of a uretdione functional group in a backbone of the polymeric material.

Embodiment 54 is the two-part composition of any of embodiments 36 to 53, comprising a solids content of 94% or greater.

Embodiment 55 is the two-part composition of any of embodiments 36 to 54, comprising a solids content of 98% or greater.

Embodiment 56 is the two-part composition of any of embodiments 36 to 55, comprising an average of 0.2 to 2.0, inclusive, of a carbamate functional group in a backbone of the polymeric material.

Embodiment 57 is the two-part composition of any of embodiments 36 to 56, wherein the polymeric material is essentially free of isocyanates.

Embodiment 58 is the two-part composition of any of embodiments 36 to 57, wherein the diisocyanate comprises hexamethylene diisocyanate.

Embodiment 59 is the two-part composition of any of embodiments 36 to 58, further comprising a catalyst.

Embodiment 60 is the two-part composition of any of embodiments 36 to 59, wherein the polymeric material comprises an average of 1.3 or fewer isocyanurate units per molecule of the polymeric material.

Embodiment 61 is the two-part composition of any of embodiments 36 to 57, 59, or 60, wherein the diisocyanate comprises a functional group selected from Formula X, Formula XI, and Formula XII:

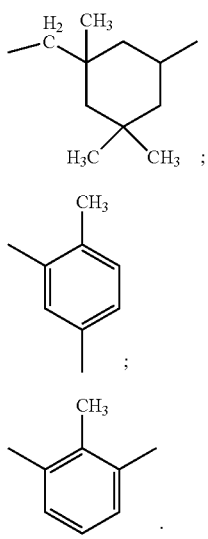

Embodiment 62 is the two-part composition of any of claims 36 to 61, wherein the first part comprises a dynamic viscosity of 10 Poise (P) to 10,000 P, inclusive, as determined using a Brookfield viscometer.

Embodiment 63 is the two-part composition of any of embodiments 36 to 62, wherein the first part comprises a dynamic viscosity of 10 P to 4,000 P, inclusive, as determined using a Brookfield viscometer.

Embodiment 64 is the two-part composition of any of embodiments 36 to 63, wherein the first part further comprises a plasticizer, a non-reactive diluent, or a combination thereof.

Embodiment 65 is the two-part composition of any of embodiments 36 to 64, wherein the first hydroxyl-containing compound is selected from 2-butanol, 2-ethyl-1-hexanol, isobutanol, and 2-butyl-octanol.

Embodiment 66 is the two-part composition of any of embodiments 36 to 65, wherein the second hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 67 is the two-part composition of any of embodiments 36 to 48 or 51 to 66, wherein the first hydroxyl-containing compound is of Formula I and the second hydroxyl-containing compound is of Formula V, wherein $R_9$ of the compound of Formula V is of Formula VI, and wherein $R_2$ of the compound of Formula II is a branched $C_4$ to $C_{20}$ alkyl.

Embodiment 68 is the two-part composition of any of embodiments 36 to 67, wherein a sum of the OH equivalents of the first hydroxyl-containing compound and the second hydroxyl-containing containing compound is equal to or greater than the isocyanate equivalents of the polymeric material.

Embodiment 69 is the two-part composition of any of embodiments 36 to 68, wherein the second hydroxyl-containing compound is a diol.

Embodiment 70 is the two-part composition of any of embodiments 36 to 69, wherein the second hydroxyl-containing compound is a diol and the reaction product comprises 0.2 to 0.5, inclusive, of diol equivalents relative to isocyanate equivalents.

Embodiment 71 is the two-part composition of any of embodiments 36 to 70, wherein the second hydroxyl-containing compound is a diol and the reaction product comprises 0.2 to 0.35, inclusive, of diol equivalents relative to isocyanate equivalents.

Embodiment 72 is the two-part composition of any of embodiments 36 to 71, wherein the first hydroxyl-containing compound comprises a branched alcohol.

Embodiment 73 is the two-part composition of any of embodiments 36 to 72, wherein the first hydroxyl-containing compound comprises a secondary alcohol.

Embodiment 74 is the two-part composition of any of embodiments 36 to 73, wherein the second hydroxyl-containing compound comprises a branched diol.

Embodiment 75 is the two-part composition of embodiment 59, wherein the catalyst comprises bismuth neodecanoate.

Embodiment 76 is the two-part composition of any of embodiments 36 to 75, wherein the first part comprises a solids content of 94% or greater.

Embodiment 77 is the two-part composition of any of embodiments 36 to 76, wherein the first part comprises a solids content of 98% or greater.

Embodiment 78 is the two-part composition of any of embodiments 36 to 77, wherein the second part comprises a solids content of 90% or greater.

Embodiment 79 is the two-part composition of any of embodiments 36 to 78, wherein the second part comprises a solids content of 98% or greater.

Embodiment 80 is the two-part composition of any of embodiments 36 to 79, wherein the second part comprises a viscosity of 0.1 Poise (P) to 5,000 P, inclusive, as determined using a Brookfield viscometer.

Embodiment 81 is the two-part composition of any of embodiments 36 to 80, wherein the second part comprises a viscosity of 0.1 Poise (P) to 1,000 P, inclusive, as determined using a Brookfield viscometer.

Embodiment 82 is a polymerized product of the two-part composition of any of embodiments 36 to 81.

Embodiment 83 is the polymerized product of embodiment 82, wherein the polymerized product coats at least a portion of a substrate.

Embodiment 84 is the polymerized product of embodiment 82 or embodiment 83, wherein the polymerized product is disposed between two substrates.

Embodiment 85 is the polymerized product of embodiment 83 or embodiment 84, wherein at least one substrate comprises a moisture impermeable material.

Embodiment 86 is the polymerized product of any of embodiments 83 to 85, wherein at least one substrate is made of a metal.

Embodiment 87 is a method of adhering two substrates together. The method comprises obtaining a two-part composition; combining at least a portion of the first part with at least a portion of the second part to form a mixture; disposing at least a portion of the mixture on a first major surface of a first substrate; and contacting a first major surface of a second substrate with the mixture disposed on the first substrate. The two-part composition comprises a first part including a polymeric material comprising a reaction product of a polymerizable composition; and a second part comprising at least one amine. The at least one amine has an average amine functionality of 2.0 or greater, and each amine is a primary amine or a secondary amine. The polymerizable composition comprises a uretdione-containing material comprising a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The polymeric material has a solids content of 90% or greater.

Embodiment 88 is the method of embodiment 87, further comprising securing the first substrate to the second substrate and allowing the mixture to cure to form an adhesive adhering the first substrate and the second substrate together.

Embodiment 89 is the method of embodiment 87 or embodiment 88, further comprising allowing the mixture to cure for at least 12 hours at ambient temperature to form an adhesive adhering the first substrate and the second substrate together.

Embodiment 90 is the method of embodiment 88 or embodiment 89, wherein the adhesive exhibits a minimum overlap shear on aluminum of 0.3 megaPascals (MPa).

Embodiment 91 is the method of any of embodiments 87 to 90, where the combining is performed on the first major surface of the first substrate.

Embodiment 92 is the method of any of embodiments 87 to 91, wherein the disposing comprises spreading the mixture on the first major surface of the first substrate.

Embodiment 93 is a method of making a two-part composition. The method includes providing a first part by forming a polymeric material including a reaction product of a polymerizable composition; and providing a second part including at least one amine. The at least one amine has an average amine functionality of 2.0 or greater and each amine is a primary amine or a secondary amine. The polymerizable composition includes a uretdione-containing material including a reaction product of a diisocyanate reacted with itself; a first hydroxyl-containing compound having a single OH group; and a second hydroxyl-containing compound having more than one OH group. The first hydroxyl-containing compound is a primary alcohol or a secondary alcohol. The polymeric material has a solids content of 90% or greater.

Embodiment 94 is the method of embodiment 93, wherein the at least one amine has an average amine functionality of 2.5 or greater.

Embodiment 95 is the method of any embodiment 93 or embodiment 94, wherein the at least one amine comprises a triamine.

Embodiment 96 is the method of any of embodiments 93 to 95, wherein the at least one amine comprises a trifunctional amine-terminated polyether.

Embodiment 97 is the method of any of embodiments 93 to 96, wherein the at least one amine comprises a reaction product of epichlorohydrin with 1,3-benzenedimethanamine.

Embodiment 98 is the method of any of embodiments 93 to 97, wherein the at least one amine comprises a molecular weight of 2,000 grams per mole or less.

Embodiment 99 is the method of any of embodiments 93 to 98, wherein the first hydroxyl-containing compound is an alkyl alcohol, a polyester alcohol, or a polyether alcohol.

Embodiment 100 is the method of any of embodiments 93 to 99, wherein the second hydroxyl-containing compound is an alkylene polyol, a polyester polyol, or a polyether polyol.

Embodiment 101 is the method of any of embodiments 93 to 100, wherein the uretdione-containing material comprises a compound of Formula I:

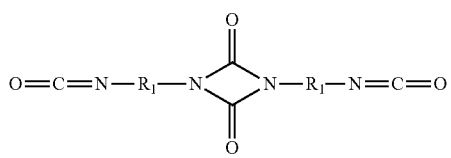

wherein $R_1$ is independently selected from a $C_4$ to $C_{14}$ alkylene, arylene, and alkaralyene.

Embodiment 102 is the method of any of embodiments 93 to 101, wherein the first hydroxyl-containing compound is of Formula II:

$$R_2\text{—OH} \qquad \qquad \text{II}$$

wherein $R_2$ is selected from $R_3$, $R_4$, and a $C_1$ to $C_{50}$ alkyl; wherein $R_3$ is of Formula III:

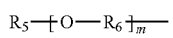

wherein m=1 to 20, $R_5$ is an alkyl, and $R_6$ is an alkylene; wherein $R_4$ is of Formula IV:

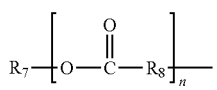

wherein n=1 to 20, $R_7$ is an alkyl, and $R_8$ is an alkylene.

Embodiment 103 is the method of any of embodiments 93 to 102, wherein the second hydroxyl-containing compound is of Formula V:

$$\text{HO—}R_9\text{—OH} \qquad \qquad \text{V}$$

wherein R$_9$ is selected from R$_{10}$, an alkylene, and an alkylene substituted with an OH group, wherein R$_{10}$ is of Formula VI or Formula VII:

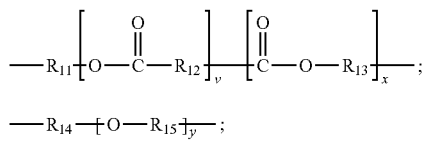

wherein each of R$_{11}$, R$_{12}$, R$_{13}$, R$_{14}$, and R$_{15}$ is independently selected from an alkylene, wherein each of v and y is independently selected from 1 to 40, and wherein x is selected from 0 to 40.

Embodiment 104 is the method of embodiment 103, wherein R$_9$ is selected from C$_1$ to C$_{20}$ alkylene and a C$_1$ to C$_{20}$ alkylene substituted with an OH group.

Embodiment 105 is the method of embodiment 103 or embodiment 104, wherein each of R$_{11}$, R$_{12}$, R$_{13}$, R$_{14}$, and R$_{15}$ is independently selected from a C$_1$ to C$_{20}$ alkylene.

Embodiment 106 is the method of any of embodiments 93 to 102, wherein the second hydroxyl-containing compound is of Formula VIII or Formula IX:

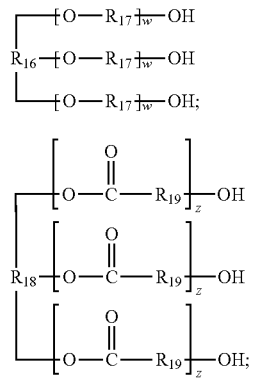

wherein each of R$_{16}$ and R$_{18}$ are independently selected from an alkane-triyl, wherein each of R$_{17}$ and R$_{19}$ is independently selected from an alkylene and wherein each of w and z is independently selected from 1 to 20.

Embodiment 107 is the method of embodiment 106, wherein each of R$_{17}$ and R$_{19}$ is independently selected from a C$_1$ to C$_{20}$ alkylene.

Embodiment 108 is the method of any of embodiments 93 to 107, comprising greater than one uretdione functional group in a backbone of the polymeric material.

Embodiment 109 is the method of any of embodiments 93 to 108, comprising an average of 1.3 to 2.5, inclusive, of a uretdione functional group in a backbone of the polymeric material.

Embodiment 110 is the method of any of embodiments 93 to 109, comprising an average of 1.5 to 1.8, inclusive, of a uretdione functional group in a backbone of the polymeric material.

Embodiment 111 is the method of any of embodiments 93 to 110, comprising a solids content of 94% or greater.

Embodiment 112 is the method of any of embodiments 93 to 111, comprising a solids content of 98% or greater.

Embodiment 113 is the method of any of embodiments 93 to 112, comprising an average of 0.2 to 2.0, inclusive, of a carbamate functional group in a backbone of the polymeric material.

Embodiment 114 is the method of any of embodiments 93 to 113, wherein the polymeric material is essentially free of isocyanates.

Embodiment 115 is the method of any of embodiments 93 to 114, wherein the diisocyanate comprises hexamethylene diisocyanate.

Embodiment 116 is the method of any of embodiments 93 to 115, further comprising a catalyst.

Embodiment 117 is the method of any of embodiments 93 to 116, wherein the polymeric material comprises an average of 1.3 or fewer isocyanurate units per molecule of the polymeric material.

Embodiment 118 is the method of any of embodiments 93 to 114, 116, or 117, wherein the diisocyanate comprises a functional group selected from Formula X, Formula XI, and Formula XII:

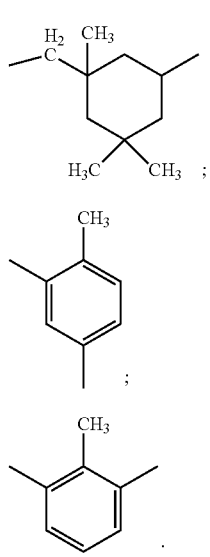

Embodiment 119 is the method of any of embodiments 93 to 118, wherein the first part comprises a dynamic viscosity of 10 Poise (P) to 10,000 P, inclusive, as determined using a Brookfield viscometer.

Embodiment 120 is the method of any of embodiments 93 to 119, wherein the first part comprises a dynamic viscosity of 10 P to 4,000 P, inclusive, as determined using a Brookfield viscometer.

Embodiment 121 is the method of any of embodiments 93 to 120, wherein the first part further comprises a plasticizer, a non-reactive diluent, or a combination thereof.

Embodiment 122 is the method of any of embodiments 93 to 121, wherein the first hydroxyl-containing compound is selected from 2-butanol, 2-ethyl-1-hexanol, isobutanol, and 2-butyl-octanol.

Embodiment 123 is the method of any of embodiments 93 to 122, wherein the second hydroxyl-containing compound is selected from 2,2-dimethyl-1,3-propanediol, 2-methyl-1,3-propanediol, diethylene glycol, poly(tetramethylene ether) glycol, 2-ethylhexane-1,3-diol, and 1,3-butanediol.

Embodiment 124 is the method of any of embodiments 93 to 105 or 108 to 123, wherein the first hydroxyl-containing compound is of Formula I and the second hydroxyl-containing compound is of Formula V, wherein $R_9$ of the compound of Formula V is of Formula VI, and wherein $R_2$ of the compound of Formula II is a branched $C_4$ to $C_{20}$ alkyl.

Embodiment 125 is the method of any of embodiments 93 to 124, wherein a sum of the OH equivalents of the first hydroxyl-containing compound and the second hydroxyl-containing compound is equal to or greater than the isocyanate equivalents of the polymeric material.

Embodiment 126 is the method of any of embodiments 93 to 125, wherein the second hydroxyl-containing compound is a diol.

Embodiment 127 is the method of any of embodiments 93 to 126, wherein the second hydroxyl-containing compound is a diol and the reaction product comprises 0.2 to 0.5, inclusive, of diol equivalents relative to isocyanate equivalents.

Embodiment 128 is the method of any of embodiments 93 to 127, wherein the second hydroxyl-containing compound is a diol and the reaction product comprises 0.2 to 0.35, inclusive, of diol equivalents relative to isocyanate equivalents.

Embodiment 129 is the method of any of embodiments 93 to 128, wherein the first hydroxyl-containing compound comprises a branched alcohol.

Embodiment 130 is the method of any of embodiments 93 to 129, wherein the first hydroxyl-containing compound comprises a secondary alcohol.

Embodiment 131 is the method of any of embodiments 93 to 130, wherein the second hydroxyl-containing compound comprises a branched diol.

Embodiment 132 is the method of embodiment 116, wherein the catalyst comprises bismuth neodecanoate.

Embodiment 133 is the method of any of embodiments 93 to 132, wherein the first part comprises a solids content of 94% or greater.

Embodiment 134 is the method of any of embodiments 93 to 133, wherein the first part comprises a solids content of 98% or greater.

Embodiment 135 is the method of any of embodiments 93 to 134, wherein the second part comprises a solids content of 90% or greater.

Embodiment 136 is the method of any of embodiments 93 to 135, wherein the second part comprises a solids content of 98% or greater.

Embodiment 137 is the method of any of embodiments 93 to 136, wherein the second part comprises a viscosity of 0.1 Poise (P) to 5,000 P, inclusive, as determined using a Brookfield viscometer.

Embodiment 138 is the method of any of embodiments 93 to 137, wherein the second part comprises a viscosity of 0.1 Poise (P) to 1,000 P, inclusive, as determined using a Brookfield viscometer.

EXAMPLES

TABLE 1

Materials List

| Material | Description | Source |
|---|---|---|
| DN3400 | HDI-based uretdione-containing material obtained under the trade designation DESMODUR N 3400 | Covestro, Leverkusen, Germany |
| 2-ethyl hexanol | | Alfa Aesar, Haverhill, MA, USA |
| 2-butanol | | Alfa Aesar |
| 1-butanol | | Alfa Aesar |
| Isobutanol | | Alfa Aesar |
| tert-butanol | | Alfa Aesar |
| 1-decanol | | Alfa Aesar |
| 2-butyl-1-octanol | | TCI, Portland, OR, USA |
| T650 | Poly(tetrahydrofuran) with a molecular weight of 650 g/mol obtained under the trade designation TERATHANE 650 polyether glycol | Sigma-Aldrich, St. Louis, MO, USA |
| 1,4-butanediol | | JT Baker, Phillipsburg, NJ, USA |
| 2,2-dimethyl-1,3-propanediol | | Alfa Aesar |
| 2-methy-1,3-propanediol | | TCI |
| Diethylene glycol | | Fisher Scientific, Hampton, NH, USA |
| Bismuth neodecanoate | | Gelest, Morrisville, PA, USA |
| JT403 | Trifunctional amine-terminated polyether obtained under the trade designation JEFFAMINE T-403 Polyetheramine | Huntsman Corporation, The Woodlands, TX, USA |
| JD400 | Difunctional amine-terminated polyether obtained under the trade designation JEFFAMINE D-400 Polyetheramine | Huntsman Corporation |
| JT3000 | Trifunctional amine-terminated polyether obtained under the trade designation JEFFAMINE T-3000 Polyetheramine | Huntsman Corporation |
| JTHF 100 | Difunctional amine-terminated polyether obtained under the trade designation JEFFAMINE THF-100 Polyetheramine | Huntsman Corporation |
| P1075LG | $C_{36}$ dimer diamine obtained under the trade designation PRIAMINE 1075-LQ-(GD) | Croda, Edison, NJ, USA |
| G328 | 1,3-benzenedimethanamine, Reaction products with epichlorohydrin, obtained under the trade designation GASKAMINE 328 | Mitsubishi Gas Chemical Company, New York, NY, USA |
| IPDA | Isophoronediamine | TCI |
| DDHM | 4,4'-Diaminodicyclohexylmethane | Alfa Aesar |
| Triethylene-tetramine | Technical grade with branched and cyclic triethylenetetramines | Alfa Aesar |
| DBA100 | Polymeric acid blocking agent obtained under the trade designation DABCO BA100 | Air Products, Allentown, PA, USA |

Overlap Shear Test Method

The performance of adhesives derived from uretdione-containing polymeric materials was determined using overlap shear tests. Aluminum coupons (25 mm×102 mm×1.6 mm) were sanded with 220 grit sandpaper and wiped with isopropanol. The polymeric material (containing uretdione functional groups) and the amine curative were each added to a plastic cup and mixed for 45 seconds to 90 seconds using a combination of hand mixing with a wood applicator stick and using a speed mixer (DAC 150 FV from Flack-tek, Landrun, S.C.) until thoroughly mixed. The mixture was then applied to a 25 mm×13 mm area on one end of the aluminum coupon, and two pieces of stainless steel wire (0.25 mm diameter) were placed in the resin to act as bondline spacers. One end of a second aluminum coupon was then pressed into to the mixture to produce an overlap of approximately 13 mm. A binder clip was placed on the sample, and it was allowed to cure for at least 18 hours. The samples were tested to failure in shear mode at a rate of 2.54 mm/minute using a tensile load frame with self-tightening grips (Sintech from MTS Systems, Eden Prairie, Minn.). After failure, the length of the overlap area was measured. The overlap shear value was then calculated by dividing the peak load by the overlap area. Overlap shear test results are summarized in Tables 3, 4, and 5 for the various formulations tested.

Gel Content Characterization

A piece of 316 stainless steel wire cloth (120×120 mesh, 6 cm×12 cm) was folded into a pouch approximately 3 cm wide and 6 cm long, and the pouch was weighed. After preparing the overlap shear test specimens, a portion of the remaining reactive mixture of uretdione-containing polymeric material and amine curative was placed between two silicone-coated polyester liners and allowed to cure for at least 24 hours. A portion of the cured mixture (between 0.15 g and 0.25 g) was placed in the pouch and weighed, and the pouch was suspended in refluxing tetrahydrofuran (THF) for 20 hours. The pouch and any remaining contents were removed from the THF and dried to constant weight. The gel content of the polymer was calculated based on the weight of material remaining in the pouch. Gel content characterization results are summarized in Tables 3 and 4 for the various formulations tested.

FTIR Characterization

The infrared (IR) spectra of the uretdione-containing polymeric material samples and the cured two-part compositions (e.g., coatings/adhesives) were obtained using an infrared Fourier Transform spectrometer (Nicolet 6700 FT-IR Spectrometer, Thermo Scientific, Madison, Wis.) equipped with a Smart iTR Diamond Attenuated Total Reflectance (ATR) accessory. For all the uretdione-containing polymeric materials except the one made with t-butanol (EX-1E), the isocyanate peak at 2260 $cm^{-1}$ was not present in the infrared spectrum, indicating that the isocyanate had reacted completely with the alcohols during the preparation of the polymeric materials. For all the polymeric materials, a strong uretdione signal at 1760 $cm^{-1}$ was observed. For all the cured two-part compositions, the uretdione signal at 1760 $cm^{-1}$ had nearly disappeared, indicating reaction of the uretdione group during the cure of the two-part compositions.

Brookfield Viscosity Measurement of Uretdione-Containing Polymeric Materials

The viscosity of the uretdione-containing polymeric materials was measured with a model LVDVII+ Viscometer (Brookfield Eng Labs Inc., Stoughton, Mass.) using a LV4 spindle at about 24° C. Samples with viscosities below 6000 poise (P) were measured at 0.6 revolutions per minute (RPM), and samples with viscosities above 6000 P were measured at 0.3 RPM. Samples that were too stiff for the spindle to penetrate the material are listed as solids, while samples that were penetrated by the spindle but were too stiff to measure are listed at a viscosity greater than 11,000 P.

NMR Analysis of DN3400

DN3400 was dissolved in deuterated dimethyl sulfoxide (DMSO) solvent. The 1H proton spectrum was taken with a 500 MHz NMR acquired with a low tip angle (15 degrees) and a relaxation delay of 4 seconds (AVANCE III 500 MHz spectrometer equipped with a broadband cryoprobe from Bruker, Billerica, Mass.). The resulting spectrum had 5 major signals. Signals at 1.31 parts per million (ppm) and 1.55 ppm were attributed to methylene groups at the 3 and 4 positions and the 2 and 5 positions of the HDI derivatives, respectively. A signal at 3.17 ppm was attributed to methylene protons adjacent to a uretdione group. A signal at 3.34 ppm was attributed to methylene protons adjacent to an isocyanate group. A signal at 3.74 ppm was attributed to methylene protons adjacent to an isocyanurate group. The integrations of these three methylene signals were 1.35, 1.79, and 0.49, respectively. The published values for DN3400 are an equivalent weight of isocyanate of 193 grams/equivalent and 22 weight percent (wt %) isocyanate. The ratio of the integration of the signal at 3.17 ppm over the integration of the signal at 3.34 ppm is 0.75, which corresponds to 16 wt % uretdione. The ratio of the integration of the signal at 3.74 ppm over the integration of the signal at 3.34 ppm is 0.27, which corresponds to 3 wt % isocyanurate. The functionality of DN3400 is published as 2.5 (in "Raw Materials for Automotive Refinish Systems" from Bayer Materials Science), so the average molecular weight of the molecule in DN3400 is 193 grams/equivalent×2.5 equivalents/mole=482 grams/mol. For every 2.5 methylene groups adjacent to isocyanate, there are 0.75*2.5=1.875 methylene groups adjacent to uretdione. There are two methylene groups adjacent to each uretdione group, so there are about 1.875/2=0.94 uretdione groups per molecule of DN3400. Similarly, for every 2.5 methylene groups adjacent to isocyanate, there are 0.27*2.5=0.68 methylene groups adjacent to isocyanurate. There are three methylene groups adjacent to each isocyanurate group, so there are about 0.68/3=0.23 isocyanurate groups per molecule of DN3400.

Calculation of Uretdione, Isocyanurate, and Carbamate Functionality in Uretdione-Containing Polymeric Materials A modified Carothers equation relates degree of polymerization (DP) to the average functionality (fav) and conversion (p) in a step growth polymerization [Carothers, Wallace (1936). "Polymers and Polyfunctionality". Transaction of the Faraday Society. 32: 39-49].

$DP=2/(2-pfav)$

This equation can be used to calculate the average degree of polymerization of each uretdione-containing polymeric material. Based on the degree of polymerization, the average number of uretdione groups in the polymeric material (fUD) can be calculated by $f(UD)=DP \times (DN3400$ molecules$)*($uretdione groups per $DN3400$ molecule$)/($total molecules$)$ where the values for "DN3400 molecules" and the "total molecules" correspond to the respective moles of molecules used to make the polymeric material, and the value for "uretdione groups per DN3400 molecule" is 0.94, as calculated based on the NMR data (above). We show below that polymeric materials with an average uretdione functionality of about 1.5 produce reasonably good properties when cured with triamine.

Similarly, the average number of isocyanurate groups in the uretdione-containing polymeric material (fICRT) can be calculated by $f(ICRT)=DP\times(DN3400 \text{ molecules})*(\text{isocyanurate groups per } DN3400 \text{ molecule})/(\text{total molecules})$ where the value for "isocyanurate groups per DN3400 molecule" is 0.23, as calculated based on the NMR data (above).

The average number of carbamate groups in the uretdione-containing polymeric material (fCBT) can similarly be calculated by $f(CBT)=DP\times(DN3400 \text{ molecules})*(\text{carbamate groups per } DN3400 \text{ molecule})/(\text{total molecules})$ where the value for "carbamate groups per DN3400 molecule" is 2.5, which is the specified isocyanate functionality for DN3400.

Examples 1A to 1Q (EX-1A to EX-1Q) and Comparative Examples 1R to 1T (CE-1R to CE-1T)—General Polymeric Material Preparation Bismuth neodecanoate (0.15 gram (g)), DN3400 (55.4 grams, HDI-based uretdione-containing material obtained under the trade designation DESMODUR N 3400 from Covestro, Leverkusen, Germany), the diol, and the monofunctional alcohol were added to a glass jar. The amounts of hydroxyl functional groups from diol and alcohol that were added correspond to the equivalent values listed in Table 2 (relative to the equivalents of isocyanate). The mixture was stirred magnetically at 700 RPM. Initially the mixture was hazy, and after about one minute, the mixture became clear and slightly warm. The mixture then continued to exotherm noticeably. Stirring was continued for a total of 5 minutes, and the polymeric material was then allowed to cool to room temperature.

The calculated uretdione functionality and viscosity of each formulation are summarized in Table 2.

Examples 2 to 34, 36 to 37 (EX-2 to EX-34, EX-36 to EX-37), and Comparative Examples 35, 38 to 40 (CE-35, CE-38 to CE-40)—Amine Cured Polymeric Material Formulations Prepared polymeric materials were cured in the presence of an amine curing agent according to the formulations summarized in Tables 3, 4, and 5. The uretdione-containing polymeric material and the amine curative were each added to a plastic cup and mixed for 45 seconds to 90 seconds using a combination of hand mixing with a wood applicator stick and using a speed mixer (DAC150 FV from Flack-tek, Landrun, S.C.). The mixture was then tested for overlap shear according to the Overlap Shear Test Method described above. Overlap shear test results are summarized in Tables 3, 4, and 5 for the various formulations tested.

Comparative Example 41 (CE-41)—Formulation Cured with Triethylenetetramine

Uretdione-containing polymeric material EX-1N (4.64 g) was mixed with triethylenetetramine (0.35 g) and DBA100 (0.02 g, polymeric acid blocking agent obtained under the trade designation DABCO BA100 from Air Products, Allentown, Pa.). It was mixed for 45 seconds and then applied to aluminum coupons (25 mm×102 mm×1.6 mm). At that point, it had increased in viscosity and gelled such that it could not flow onto the aluminum surface to form a thin adhesive layer. Thus, it was not possible to prepare a sample of this formulation to test for overlap shear.

TABLE 2

Uretdione Oligomer Formulations and Viscosities

| Sample | Alcohol Type | g | Relative equiv. | Diol Type | g | Relative equiv. | DN3400 g | Catalyst g | Calculated Uretdione Functionality ($f_{UD}$) | Viscosity at 24 hours (P) | Viscosity at 3 weeks (P) |
|---|---|---|---|---|---|---|---|---|---|---|---|
| EX-1A | 2-Butanol | 15.09 | 0.71 | 2,2-dimethyl-1,3-propanediol | 4.35 | 0.29 | 55.41 | 0.15 | 1.48 | 5850 | 7980 |
| EX-1B | 2-Ethyl-1-hexanol | 26.49 | 0.71 | 2,2-dimethyl-1,3-propanediol | 4.35 | 0.29 | 55.41 | 0.15 | 1.48 | 830 | 990 |
| EX-1C | 1-Butanol | 15.09 | 0.71 | 2,2-dimethyl-1,3-propanediol | 4.35 | 0.29 | 55.41 | 0.15 | 1.48 | Solid | |
| EX-1D | isobutanol | 15.09 | 0.71 | 2,2-dimethyl-1,3-propanediol | 4.35 | 0.29 | 55.41 | 0.15 | 1.48 | Solid | |
| EX-1E | 1-Decanol | 32.15 | 0.71 | 2,2-dimethyl-1,3-propanediol | 4.35 | 0.29 | 55.41 | 0.15 | 1.48 | Solid | |
| EX-1F | 2-butyl-octanol | 37.92 | 0.71 | 2,2-dimethyl-1,3-propanediol | 4.35 | 0.29 | 55.41 | 0.15 | 1.48 | 670 | 550 |
| EX-1G | 2-Butanol | 15.09 | 0.71 | 2-methyl-1,3-propanediol | 3.76 | 0.29 | 55.41 | 0.15 | 1.48 | 4130 | Solid |
| EX-1H | 2-Butanol | 15.09 | 0.71 | 1,4-Butanediol | 3.76 | 0.29 | 55.41 | 0.15 | 1.48 | Solid | |
| EX-1I | 2-Butanol | 15.09 | 0.71 | Diethylene Glycol | 4.43 | 0.29 | 55.41 | 0.15 | 1.48 | 2650 | Solid |
| EX-1J | 2-Butanol | 15.09 | 0.71 | T650 | 27.12 | 0.29 | 55.41 | 0.15 | 1.48 | 900 | 5340 |
| EX-1K | 2-Butanol | 10.64 | 0.50 | 2,2-dimethyl-1,3-propanediol | 4.35 | 0.50 | 55.41 | 0.15 | 2.51 | >11000 | |
| EX-1L | 2-Butanol | 12.76 | 0.60 | 2,2-dimethyl-1,3-propanediol | 7.48 | 0.40 | 55.41 | 0.15 | 1.88 | >11000 | |
| EX-1M | 2-Butanol | 14.18 | 0.67 | 2,2-dimethyl-1,3-propanediol | 5.98 | 0.33 | 55.41 | 0.15 | 1.61 | 11140 | 9980 |

TABLE 2-continued

Uretdione Oligomer Formulations and Viscosities

| | Alcohol | | | Diol | | | DN3400 | Catalyst | Calculated Uretdione Functionality | Viscosity at 24 hours | Viscosity at 3 weeks |
|---|---|---|---|---|---|---|---|---|---|---|---|
| Sample | Type | g | Relative equiv. | Type | g | Relative equiv. | g | g | ($f_{UD}$) | (P) | (P) |
| EX-1N | 2-Butanol | 15.96 | 0.75 | 2,2-dimethyl-1,3-propanediol | 4.98 | 0.25 | 55.41 | 0.15 | 1.37 | 3550 | 12360 |
| EX-1O | 2-Butanol | 16.55 | 0.78 | 2,2-dimethyl-1,3-propanediol | 3.74 | 0.22 | 55.41 | 0.15 | 1.30 | 2640 | Solid |
| EX-1P | 2-Ethyl-1-hexanol | 26.51 | 0.71 | 2-Ethylhexane-1,3-diol | 6.10 | 0.29 | 55.41 | 0.15 | 1.48 | 670 | 860 |
| EX-1Q | 2-Butanol | 15.09 | 0.71 | 1,3-butanediol | 3.77 | 0.29 | 55.41 | 0.15 | 1.48 | 3800 | 10420 |
| CE-1R | tert-butanol | 15.09 | 0.71 | 2,2-dimethyl-1,3-propanediol | 4.35 | 0.29 | 55.41 | 0.15 | 1.48 | Insufficient Reaction | |
| CE-1S | 2-Ethyl-1-hexanol | 12.45 | 0.33 | 2-Ethylhexane-1,3-diol | 13.99 | 0.67 | 55.41 | 0.15 | 5.65 | >11000 | |
| CE-1T | 2-Butanol | 7.09 | 0.33 | 1,3-butanediol | 8.63 | 0.67 | 55.41 | 0.15 | 5.65 | Solid | |

TABLE 3

Adhesive Performance with Varied Uretdione-Containing Polymeric Materials

| | Uretdione Resin | | Curing Agent | | Overlap Shear on | |
|---|---|---|---|---|---|---|
| Sample Number | Polymeric Material | Amount (g) | Amine | Amount (g) | Aluminum [psi (MPa)] | Gel Content |
| EX-2 | EX-1A | 4.07 | JT403 | 0.93 | 454 (3.1) | |
| EX-3 | EX-1A | 3.99 | JT403 | 1.01 | 856 (5.9) | 71% |
| EX-4 | EX-1B | 4.18 | JT403 | 0.82 | 99 (0.7) | |
| EX-5 | EX-1B | 4.10 | JT403 | 0.90 | 166 (1.1) | 62% |
| EX-6 | EX-1F | 4.26 | JT403 | 0.74 | 59 (0.4) | |
| EX-7 | EX-1F | 4.19 | JT403 | 0.81 | 163 (1.1) | 61% |
| EX-8 | EX-1G | 4.07 | JT403 | 0.93 | 348 (2.4) | |
| EX-9 | EX-1G | 3.99 | JT403 | 1.01 | 667 (4.6) | 69% |
| EX-10 | EX-1I | 4.07 | JT403 | 0.93 | 409 (2.8) | |
| EX-11 | EX-1I | 3.99 | JT403 | 1.01 | 737 (5.1) | 76% |
| EX-12 | EX-1J | 4.36 | JT403 | 0.74 | 57 (0.4) | |
| EX-13 | EX-1J | 4.19 | JT403 | 0.81 | 165 (1.1) | 74% |
| EX-14 | EX-1K | 4.06 | JT403 | 0.94 | 824 (5.7) | |
| EX-15 | EX-1K | 3.98 | JT403 | 1.02 | 651 (4.5) | 68% |
| EX-16 | EX-1L | 4.07 | JT403 | 0.93 | 885 (6.1) | |
| EX-17 | EX-1L | 3.98 | JT403 | 1.02 | 1102 (7.6) | 74% |
| EX-18 | EX-1M | 4.07 | JT403 | 0.93 | 532 (3.7) | |
| EX-19 | EX-1M | 3.99 | JT403 | 1.01 | 1059 (7.3) | 79% |
| EX-20 | EX-1N | 4.08 | JT403 | 0.92 | 270 (1.9) | |
| EX-21 | EX-1N | 3.99 | JT403 | 1.01 | 855 (5.9) | 67% |
| EX-22 | EX-1O | 4.08 | JT403 | 0.92 | 151 (1.0) | |
| EX-23 | EX-1O | 4.00 | JT403 | 1.00 | 583 (4.0) | 56% |
| EX-24 | EX-1P | 4.19 | JT403 | 0.81 | 93 (0.6) | 76% |
| EX-25 | EX-1Q | 4.07 | JT403 | 0.93 | 539 (3.7) | 69% |

TABLE 4

Adhesive Performance with Varied Curing Agents

| | Polymeric | | Additional Curing Agent | | Avg. | Overlap Shear on | |
|---|---|---|---|---|---|---|---|
| Sample Number | Material EX-1A (g) | J T403 (g) | Amine | Amount (g) | Amine Functionality | Aluminum [psi (MPa)] | Gel Content |
| EX-26 | 3.99 | 1.01 | none | 0 | 3.0 | 856 (5.9) | 71% |
| EX-27 | 3.88 | 0.65 | JD400 | 0.48 | 2.6 | 178 (1.2) | 47% |
| EX-28 | 3.82 | 0.48 | JD400 | 0.72 | 2.4 | 143 (1.0) | 51% |
| EX-29 | 3.77 | 0.32 | JD400 | 0.97 | 2.2 | 41 (0.3) | 34% |
| EX-30 | 3.67 | 0.00 | JD400 | 1.45 | 2.0 | 0 (0) | |
| EX-31 | 3.47 | 0.58 | JTHF100 | 1.09 | 2.6 | 100 (0.7) | 53% |
| EX-32 | 3.81 | 0.64 | P1075LG | 0.57 | 2.6 | 388 (2.7) | 52% |
| EX-33 | 4.12 | 0.69 | G328 | 0.18 | — | 569 (3.9) | 64% |
| EX-34 | 4.41 | 0.00 | G328 | 0.53 | — | 171 (1.2) | 32% |
| CE-35 | 2.90 | 0.49 | JT3000 | 2.21 | 3.0 | 0 (0) | 31% |

TABLE 5

Adhesive Performance with Varied Curing Agents

| Sample Number | Uretdione-Containing Polymeric Example | Material Amount | Butyl Acetate | Curing Agent Amine | Amount (g) | Overlap Shear on Aluminum [psi (MPa)] |
|---|---|---|---|---|---|---|
| EX-36 | EX-1Q | 4.46 | 0 | IPDA | 0.54 | 135 (0.9) |
| EX-37 | EX-1Q | 4.35 | 0 | DDHM | 0.65 | 289 (2.0) |
| CE-38 | EX-1Q | 4.07 | 3.16 | JT403 | 0.93 | 6 (0.04) |
| CE-39 | EX-1Q | 4.46 | 3.79 | IPDA | 0.54 | 0 (0) |
| CE-40 | EX-1Q | 4.35 | 3.61 | DDHM | 0.65 | 0 (0) |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymeric material comprising a reaction product of a polymerizable composition, the polymerizable composition comprising:

a. a uretdione-containing material comprising a reaction product of a diisocyanate reacted with itself;

b. a first hydroxyl-containing compound having a single OH group, wherein the first hydroxyl-containing compound is a primary alcohol or a secondary alcohol; and c. a second hydroxyl-containing compound having more than one OH group, wherein the second hydroxyl-containing compound is a diol and the polymerizable composition comprises 0.2 to 0.5, inclusive, of OH equivalents from the diol relative to isocyanate equivalents;

wherein the polymeric material comprises a solids content of 90% or greater, wherein the polymeric material comprises an average of 1.3 to 2.5, inclusive, of a uretdione functional group in a backbone of the polymeric material, and wherein the polymeric material comprises a dynamic viscosity of 10 Poise (P) to 10,000 P, inclusive, as determined using a Brookfield viscometer at 24 degrees Celsius.

2. The polymeric material of claim 1, wherein the first hydroxyl-containing compound is an alkyl alcohol, a polyester alcohol, or a polyether alcohol.

3. The polymeric material of claim 1, wherein the second hydroxyl-containing compound is an alkylene diol, a polyester diol, or a polyether diol.

4. The polymeric material of claim 1, wherein the uretdione-containing material comprises a compound of Formula I:

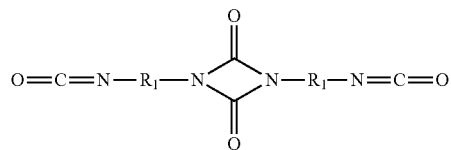

wherein $R_1$ is independently selected from a $C_4$ to $C_{14}$ alkylene, arylene, and alkaralyene.

5. The polymeric material of claim 1, wherein the first hydroxyl-containing compound is of Formula II:

$$R_2\text{—OH} \qquad \text{II}$$

wherein $R_2$ is selected from $R_3$, $R_4$, and a $C_1$ to $C_{50}$ alkyl; wherein $R_3$ is of Formula III:

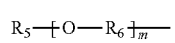

wherein m=1 to 20, $R_5$ is an alkyl, and $R_6$ is an alkylene;

wherein $R_4$ is of Formula IV:

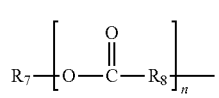

wherein n=1 to 20, $R_7$ is an alkyl, and $R_8$ is an alkylene.

6. The polymeric material of claim 1, wherein the second hydroxyl-containing compound is of Formula V:

$$\text{HO—}R_9\text{—OH} \qquad \text{V}$$

wherein $R_9$ is selected from $R_{10}$, and an alkylene wherein $R_{10}$ is of Formula VI or Formula VII:

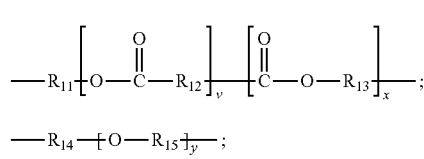

wherein each of $R_{11}$, $R_{12}$, $R_{13}$, $R_{14}$, and $R_{15}$ is independently selected from an alkylene, wherein each of v and y is independently selected from 1 to 40, and wherein x is selected from 0 to 40.

7. The polymeric material of claim 1, comprising an average of 1.5 to 1.8, inclusive, of a uretdione functional group in a backbone of the polymeric material.

8. The polymeric material of claim 1, wherein the polymeric material is essentially free of isocyanates.

9. The polymeric material of claim 1, wherein the diisocyanate comprises hexamethylene diisocyanate.

10. The polymeric material of claim 1, wherein the polymeric material comprises an average of 1.3 or fewer isocyanurate units per molecule of the polymeric material.

11. The polymeric material of claim 1, wherein a sum of the OH equivalents of the first hydroxyl-containing compound and the second hydroxyl-containing compound is equal to or greater than the isocyanate equivalents of the polymeric material.

12. A two-part composition comprising:
 a. a first part comprising a polymeric material comprising a reaction product of a polymerizable composition, the polymerizable composition comprising:
  i. a uretdione-containing material comprising a reaction product of a diisocyanate reacted with itself;
  ii. a first hydroxyl-containing compound having a single OH group, wherein the first hydroxyl-containing compound is a primary alcohol or a secondary alcohol; and
  iii. a second hydroxyl-containing compound having more than one OH group wherein the second hydroxyl-containing compound is a diol and the polymerizable composition comprises 0.2 to 0.5, inclusive, of OH equivalents from the diol relative to isocyanate equivalents;
  wherein the polymeric material comprises an average of 1.3 to 2.5, inclusive, of a uretdione functional group in a backbone of the polymeric material and wherein the polymeric material comprises a solids content of 90% or greater and wherein the polymeric material comprises a dynamic viscosity of 10 Poise (P) to 10,000 P, inclusive, as determined using a Brookfield viscometer at 24 degrees Celsius; and
 b. a second part comprising at least one amine, the at least one amine having an average amine functionality of 2.0 or greater, wherein each amine is a primary amine or a secondary amine.

13. The two-part composition of claim 12, wherein the at least one amine comprises a molecular weight of 2,000 grams per mole or less.

14. A polymerized product of the two-part composition of claim 12.

15. The polymerized product of claim 14, wherein the polymerized product coats at least a portion of a substrate.

16. The polymerized product of claim 14, wherein the polymerized product is disposed between two substrates.

17. The polymerized product of claim 15, wherein at least one substrate comprises a moisture impermeable material.

18. A method of adhering two substrates together, the method comprising:
 a. obtaining a two-part composition, the two-part composition comprising:
  i. a first part comprising comprising a polymeric material comprising a reaction product of a polymerizable composition, the polymerizable composition comprising:
   1. a uretdione-containing material comprising a reaction product of a diisocyanate reacted with itself;
   2. a first hydroxyl-containing compound having a single OH group, wherein the first hydroxyl-containing compound is a primary alcohol or a secondary alcohol; and
   3. a second hydroxyl-containing compound having more than one OH group wherein the second hydroxyl-containing compound is a diol and the polymerizable composition comprises 0.2 to 0.5, inclusive, of OH equivalents from the diol relative to isocyanate equivalents;
  wherein the polymeric material comprises an average of 1.3 to 2.5, inclusive, of a uretdione functional group in a backbone of the polymeric material and wherein the polymeric material comprises a solids content of 90% or greater and wherein the polymeric material comprises a dynamic viscosity of 10 Poise (P) to 10,000 P, inclusive, as determined using a Brookfield viscometer at 24 degrees Celsius; and
  ii. a second part comprising at least one amine, the at least one amine having an average amine functionality of 2.0 or greater, wherein each amine is a primary amine or a secondary amine;
 b. combining at least a portion of the first part with at least a portion of the second part to form a mixture;
 c. disposing at least a portion of the mixture on a first major surface of a first substrate; and
 d. contacting a first major surface of a second substrate with the mixture disposed on the first substrate.

19. The method of claim 18, wherein the adhesive exhibits a minimum overlap shear on aluminum of 0.3 megaPascals (MPa).

20. A method of making a two-part composition, the method comprising:
 a. providing a first part by forming a polymeric material comprising a reaction product of a polymerizable composition, the polymerizable composition comprising:
  i. a uretdione-containing material comprising a reaction product of a diisocyanate reacted with itself;
  ii. a first hydroxyl-containing compound having a single OH group, wherein the first hydroxyl-containing compound is a primary alcohol or a secondary alcohol; and
  iii. a second hydroxyl-containing compound having more than one OH group wherein the second hydroxyl-containing compound is a diol and the polymerizable composition comprises 0.2 to 0.5, inclusive, of OH equivalents from the diol relative to isocyanate equivalents;
  wherein the polymeric material comprises an average of 1.3 to 2.5, inclusive, of a uretdione functional group in a backbone of the polymeric material and wherein the polymeric material comprises a solids content of 90% or greater and wherein the polymeric material comprises a dynamic viscosity of 10 Poise (P) to 10,000 P, inclusive, as determined using a Brookfield viscometer at 24 degrees Celsius; and
 b. providing a second part comprising at least one amine, the at least one amine having an average amine functionality of 2.0 or greater, wherein each amine is a primary amine or a secondary amine.

* * * * *

UNITED STATES PATENT AND TRADEMARK OFFICE
CERTIFICATE OF CORRECTION

PATENT NO. : 11,292,870 B2
APPLICATION NO. : 16/632679
DATED : April 5, 2022
INVENTOR(S) : Joseph Douglas Rule Page 1 of 1

It is certified that error appears in the above-identified patent and that said Letters Patent is hereby corrected as shown below:

In the Claims

Column 41
Line 49 (approx.), In Claim 18, delete "a first part comprising comprising a polymeric" and insert -- a first part comprising a polymeric --, therefor.

Signed and Sealed this
Thirteenth Day of June, 2023

Katherine Kelly Vidal
*Director of the United States Patent and Trademark Office*